US012097532B2

(12) United States Patent
Sakai

(10) Patent No.: US 12,097,532 B2
(45) Date of Patent: Sep. 24, 2024

(54) METHOD FOR FORMING MULTILAYER COATING FILM

(71) Applicant: KANSAI PAINT CO., LTD., Hyogo (JP)

(72) Inventor: Kenji Sakai, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 211 days.

(21) Appl. No.: 17/766,030

(22) PCT Filed: Sep. 10, 2020

(86) PCT No.: PCT/JP2020/034232
§ 371 (c)(1),
(2) Date: Apr. 1, 2022

(87) PCT Pub. No.: WO2021/065401
PCT Pub. Date: Apr. 8, 2021

(65) Prior Publication Data
US 2022/0355338 A1  Nov. 10, 2022

(30) Foreign Application Priority Data

Oct. 3, 2019  (JP) .................. 2019-182826

(51) Int. Cl.
B05D 7/00  (2006.01)
B05D 5/06  (2006.01)
C09D 17/00  (2006.01)
C09D 175/04  (2006.01)

(52) U.S. Cl.
CPC ............. B05D 7/572 (2013.01); B05D 5/06 (2013.01); C09D 17/00 (2013.01); C09D 175/04 (2013.01)

(58) Field of Classification Search
None
See application file for complete search history.

(56) References Cited

U.S. PATENT DOCUMENTS

2003/0019398 A1* 1/2003 Komatsu ............. C09B 68/4253
106/497
2015/0064476 A1  3/2015 Kanda
2015/0111026 A1* 4/2015 Azuma .................... B05D 7/14
428/327
2015/0218405 A1  8/2015 Iwata et al.
2018/0021810 A1  1/2018 Takayama et al.
2019/0308217 A1  10/2019 Okazaki et al.
2020/0010698 A1  1/2020 Kurashina et al.
2020/0338591 A1  10/2020 Sakai et al.
2021/0276042 A1  9/2021 Itoh et al.

FOREIGN PATENT DOCUMENTS

| JP | 2009-155537 | 7/2009 |
| JP | 2013-212482 A | 10/2013 |
| JP | 2014-080569 | 5/2014 |
| JP | 2018-171614 | 11/2018 |
| WO | 2014/045657 | 3/2014 |
| WO | 2016/0121238 | 8/2016 |
| WO | 2018/012014 | 1/2018 |
| WO | 2018/092874 | 5/2018 |
| WO | 2019/139138 | 7/2019 |

OTHER PUBLICATIONS

International Search Report issued Nov. 17, 2020 in International (PCT) Application No. PCT/JP2020/034232.
Extended European Search Report issued Sep. 25, 2023 in corresponding European Patent Application No. 20872031.8.

* cited by examiner

Primary Examiner — Francisco W Tschen
(74) Attorney, Agent, or Firm — Wenderoth, Lind & Ponack, L.L.P.

(57) ABSTRACT

This invention provides a method for forming a multilayer coating film, comprising applying a base paint (X) having a solids content ratio of 30 to 62 mass % to a substrate to form a base coating film having a cured film thickness of 6 to 45 μm; applying an effect pigment dispersion (Y) having a solids content ratio of 0.1 to 10 mass % to the base coating film to form an effect coating film having a cured film thickness of 0.1 to 5.0 μm; applying a two-component clear paint (Z) containing a hydroxy-containing resin and a polyisocyanate compound to the effect coating film to form a clear coating film; and heating the base coating film, the effect coating film, and the clear coating film to simultaneously cure these coating films; wherein the base paint (X) contains a polyurethane resin (A), an alcohol (B) containing 6 to 12 carbon atoms, and an organic solvent (C) having an HLB of 7 to 9, and the effect pigment dispersion (Y) contains water, a flake-effect pigment (P), a resin emulsion (Q), and cellulose nanofibers (R).

6 Claims, No Drawings

METHOD FOR FORMING MULTILAYER COATING FILM

TECHNICAL FIELD

The present invention relates to a method for forming a multilayer coating film.

BACKGROUND ART

The purpose of applying paints is mainly to protect materials and impart an excellent appearance to materials. For industrial products, excellent appearance, particularly "texture," is important in terms of enhancing their product appeal.

Although there are various textures for industrial products desired by consumers, metallic or pearlescent luster (referred to below as "metallic luster") has recently been desired in the field of automobile exterior panels, automobile components, home appliances, and the like.

Metallic luster refers to a texture that has no surficial graininess, like the surface of a mirror, and that shines brilliantly when a coated plate is viewed nearly perpendicular to the coated plate (also referred to as "highlight").

Patent Literature (PTL) 1 discloses an aqueous base paint composition containing an effect pigment composed of metal flakes obtained by crushing a vapor deposition metal film and an 30 aqueous cellulose derivative having an acid value of 20 to 150 mgKOH/g (solids content), wherein the aqueous cellulose derivative serves as a main binder resin, and the content of the effect pigment is 20 to 70 mass % as PWC.

However, the coating film formed of the paint disclosed in PTL 1 is unsatisfactory in terms of metallic luster.

CITATION LIST

Patent Literature

PTL 1: JP2009-155537A

SUMMARY OF INVENTION

Technical Problem

An object of the present invention is to provide a method for forming a multilayer coating film, the method being capable of producing a multilayer coating film with excellent metallic luster.

Solution to Problem

According to one embodiment of the present invention, the present invention provides a method for forming a multilayer coating film, comprising the following steps (1) to (4):
(1) applying a base paint (X) having a solids content ratio of 30 to 62 mass % to a substrate to form a base coating film having a cured film thickness of 6 to 45 µm;
(2) applying an effect pigment dispersion (Y) having a solids content ratio of 0.1 to 10 mass % to the base coating film formed in step (1) to form an effect coating film having a cured film thickness of 0.1 to 5.0 µm;
(3) applying a two-component clear paint (Z) containing a hydroxy-containing resin and a polyisocyanate compound to the effect coating film formed in step (2) to form a clear coating film; and
(4) heating the uncured base coating film, the uncured effect coating film, and the uncured clear coating film formed in steps (1) to (3) to simultaneously cure these coating films; wherein
the base paint (X) contains a polyurethane resin (A), an alcohol (B) containing 6 to 12 carbon atoms, and an organic solvent (C) having an HLB of 7 to 9, and
the effect pigment dispersion (Y) contains water, a flake-effect pigment (P), a resin emulsion (Q), and cellulose nanofibers (R).

Advantageous Effects of Invention

The method for forming a multilayer coating film of the present invention is capable of producing a multilayer coating film with excellent metallic luster.

DESCRIPTION OF EMBODIMENTS

The method for forming a multilayer coating film of the present invention is described in more detail below.
Step (1)
Step (1) is to apply a base paint (X) to a substrate to form a base coating film. In this step, the base paint (X) having a solids content ratio of 30 to 62 mass %, preferably 34 to 61 mass %, and more preferably 40 to 60 mass % is applied to a substrate to form a base coating film having a cured film thickness of 6 to 45 µm, preferably 8 to 40 µm, and more preferably 15 to 35 µm.
Substrate
Examples of substrates for use in the method for forming a multilayer coating film of the present invention include metal materials, such as metals (e.g., iron, zinc, and aluminum) and alloys containing these metals; molded products of these metals; molded products of glass, plastic, and foamed articles; films; and the like. These materials can be suitably subjected to degreasing treatment or surface treatment to obtain substrates. Examples of the surface treatment include phosphate treatment, chromate treatment, composite oxide treatment, and the like. Further, when the material of the substrate is metal, a cationic electrodeposition coating film is preferably formed on a surface-treated metal material using a cationic electrodeposition paint. An intermediate coating film may be formed on the cationic electrodeposition coating film. The intermediate coating film is preferably colored, in terms of undercoat hiding power, weatherability, and the like.

The intermediate coating film may be a cured or uncured coating film.

Further, when the material of the substrate is plastic, it is preferred that a primer coating film be formed on a degreased plastic material using a primer paint. The primer coating film may be a cured or uncured coating film.
Base Paint (X)
The base paint (X) contains a polyurethane resin (A), an alcohol (B) containing 6 to 12 carbon atoms, and an organic solvent (C) having an HLB of 7 to 9.

The base paint (X) may be an aqueous paint or a solvent-based paint. From the standpoint of reducing the VOC of the paint, the base paint is preferably an aqueous paint.
Polyurethane Resin (A)
The polyurethane resin (A) may be any polyurethane resin as long as it is typically used for paints, and is preferably those dissolved or dispersed in water, and more preferably a polyurethane resin emulsion (A-1) obtained by dispersing the polyurethane resin (A) in water. The polyurethane resin emulsion (A-1) may be modified with a resin, such as acrylic resin.

The polyurethane resin emulsion (A-1) can be synthesized, for example, by using a polyisocyanate component and a polyol component, and optionally further using a compound containing both an active hydrogen group and an ion-forming group as a water-dispersing-group-providing component.

The polyisocyanate component is a compound containing at least two isocyanate groups per molecule. Examples include aliphatic polyisocyanates, alicyclic polyisocyanates, aromatic-aliphatic polyisocyanates, aromatic polyisocyanates, derivatives of these polyisocyanates, and any combinations thereof.

Examples of aliphatic polyisocyanates include aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and methyl 2,6-diisocyanatohexanoate (common name: lysine diisocyanate); and aliphatic triisocyanates, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane.

Examples of alicyclic polyisocyanates include alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or mixtures thereof, and methylenebis(4,1-cyclohexanediyl)diisocyanate (common name: hydrogenated MDI), and norbornane diisocyanate; and alicyclic triisocyanates, such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1) heptane, 2-(3-isocyanatopropyl)-2,6-di(isocyanatomethyl)-bicyclo(2.2.1)heptane, 3-(3-isocyanatopropyl)-2,5-di (isocyanatomethyl)-bicyclo(2.2.1)heptane, 5-(2-isocyanatoethyl)-2-isocyanatomethy-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, and 6-(2-isocyanatoethyl)-2-isocyanatomethyl-2-(3-isocyanatopropyl)-bicyclo(2.2.1)heptane.

Of these, preferable alicyclic polyisocyanates are 3-isocyanatomethyl-3,5,5-trimethylcyclohexyl isocyanate (common name: isophorone diisocyanate) and methylenebis(4,1-cyclohexanediyl)diisocyanate (common name: hydrogenated MDI), from the standpoint of improving the organic solvent resistance of the resulting coating film.

Examples of aromatic-aliphatic polyisocyanates include aromatic-aliphatic diisocyanates, such as methylenebis(4,1-phenylene)diisocyanate (common name: MDI), 1,3- or 1,4-xylylene diisocyanate or mixtures thereof, ω,ω'-diisocyanato-1,4-diethylbenzene, and 1,3- or 1,4-bis(1-isocyanato-1-methylethyl)benzene (common name: tetramethylxylylene diisocyanate) or mixtures thereof; and aromatic-aliphatic triisocyanates, such as 1,3,5-triisocyanatomethylbenzene.

Examples of aromatic polyisocyanates include aromatic diisocyanates, such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI) or 2,6-tolylene diisocyanate (common name: 2,6-TDI) or mixtures thereof, 4,4'-toluidine diisocyanate, and 4,4'-diphenylether diisocyanate; aromatic triisocyanates, such as triphenylmethane-4,4',4''-triisocyanate, 1,3,5-triisocyanatobenzene, and 2,4,6-triisocyanatotoluene; and aromatic tetraisocyanates, such as 4,4'-diphenylmethane-2,2',5,5'-tetraisocyanate.

Examples of derivatives of the polyisocyanates include dimers, trimers, biurets, allophanates, urethodiones, urethoimines, isocyanurates, oxadiazinetriones, polymethylene polyphenyl polyisocyanates (crude MDI, polymeric MDI), or crude TDI of the polyisocyanates described above. These polyisocyanates and derivatives thereof may be used singly, or in a combination of two or more.

The polyisocyanate component may be used in the form of blocked isocyanate blocked with a blocking agent.

Examples of blocking agents include phenols, such as phenol, cresol, xylenol, nitrophenol, ethylphenol, hydroxydiphenyl, butylphenol, isopropylphenol, nonylphenol, octylphenol, and methyl hydroxybenzoate; lactams, such as ε-caprolactam, δ-valerolactam, γ-butyrolactam, and β-propiolactam; aliphatic alcohols, such as methanol, ethanol, propyl alcohol, butyl alcohol, amyl alcohol, and lauryl alcohol; ethers, such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; alcohols, such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oximes, such as formamide oxime, acetamide oxime, acetoxime, methyl ethyl ketoxime, diacetyl monoxime, benzophenone oxime, and cyclohexane oxime; active methylenes, such as dimethyl malonate, diethyl malonate, ethyl acetoacetate, methyl acetoacetate, and acetylacetone; mercaptans, such as butyl mercaptan, t-butyl mercaptan, hexyl mercaptan, t-dodecyl mercaptan, 2-mercaptobenzothiazole, thiophenol, methylthiophenol, and ethylthiophenol; acid amides, such as acetanilide, acetanisidide, acetotoluide, acrylamide, methacrylamide, amide acetate, amide stearate, and benzamide; imides, such as succinimide, phthalimide, and maleimide; amines, such as diphenylamine, phenylnaphthylamine, xylidine, N-phenylxylidine, carbazole, aniline, naphthylamine, butylamine, dibutylamine, and butylphenylamine; imidazoles, such as imidazole and 2-ethylimidazole; ureas, such as urea, thiourea, ethylene urea, ethylenethiourea, and diphenylurea; carbamic acid esters, such as phenyl N-phenylcarbamate; imines, such as ethyleneimine and propyleneimine; sulfites, such as sodium bisulfite and potassium bisulfite; and azole-based compounds. Examples of azole-based compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives, such as imidazole, benzimidazole, 2-methylimidazole, 2-ethylimidazole, and 2-phenylimidazole; and imidazoline derivatives, such as 2-methylimidazoline and 2-phenylimidazoline.

Blocking (reacting with a blocking agent) may be performed by optionally adding a solvent. The solvent for use in blocking reaction is preferably those that are not reactive with isocyanate groups. Examples include ketones, such as acetone and methyl ethyl ketone; and esters, such as ethyl acetate; and N-methyl-2-pyrrolidone (NMP).

The polyisocyanate component preferably contains an alicyclic polyisocyanate from the standpoint of obtaining a multilayer coating film with excellent metallic luster, as well as excellent adhesion and water resistance. The content of the alicyclic polyisocyanate is preferably 50 to 100 mass %, and more preferably 70 to 100 mass %, based on the total solids content of the polyisocyanate component.

The polyol component is a compound containing at least two hydroxy groups per molecule.

Examples of the polyol component for use include polyols having a low molecular weight of less than 300. Examples of low-molecular-weight polyols include ethylene glycol, propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexane glycol, 2,5-hexanediol, dipropylene glycol, 2,2,4-trimethyl-1,3-pentanediol, tricyclodecanedimethanol, and 1,4-cyclohexanedimethanol. In one embodiment, low-molecular-weight polyols consist only of hydrocarbon chains and hydroxy groups. The low-molecular-weight polyols may be used singly, or in a combination of two or more.

Further, the polyol component may be a polyol having a high molecular weight of 300 or more. Examples of high-molecular-weight polyols for use include polyether polyols, polycarbonate polyols, polyester polyols, and polyether ester polyols. These may be used singly, or in a combination of two or more.

The polyether polyols for use may be alkylene oxide adducts of the low-molecular-weight polyols, ring-opening (co)polymers of alkylene oxides or cyclic ethers (e.g., tetrahydrofuran) of the low-molecular-weight polyols, and the like. Specific examples include polyethylene glycol, polypropylene glycol, (blocked or random) copolymers of ethylene glycol and propylene glycol, polytetramethylene glycol, polyhexamethylene glycol, and polyoctamethylene glycol.

The polycarbonate polyols for use may be, for example, compounds represented by the following formula:

$$HO\text{---}R\text{---}(O\text{---}C(O)\text{---}O\text{---}R)_x\text{---}OH,$$

wherein R is a $C_{1-12}$ alkylene group or a $C_{1-3}$ alkylene-$C_{3-8}$ cycloalkylene-$C_{1-3}$ alkylene group, and x is the number of repeating units of the molecule and is typically an integer of 5 to 50, and wherein each R may be the same or different. These compounds can be obtained, for example, by a transesterification method in which a polyol is reacted with a substituted carbonate (e.g., diethyl carbonate or diphenyl carbonate) under conditions such that hydroxy groups are present in excess; or a method in which the saturated aliphatic polyol described above is reacted with a phosgene, or the reaction product is then further reacted, if necessary, with the saturated aliphatic polyol.

The $C_{1-2}$ alkylene group (saturated aliphatic polyol residue) represented by R may be, for example, a $C_{1-12}$ linear or branched (preferably linear) alkylene group. Examples include —$CH_2$—, —$(CH_2)_2$—, —$(CH_2)_3$—, —$(CH_2)_4$—, —$CH_2$—$CH(CH_3)$—$CH_2$—, —$(CH_2)_5$—, —$CH_2$—$CH$ 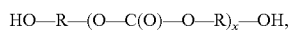 $(C_2H)$—$CH_2$—, —$(CH_2)$—, —$(CH_2)$—, —$(CH_2)$—, —$(CH_2)_5$—, —$(CH_2)_{10}$—, —$(CH_2)_{11}$—, —$(CH_2)_{12}$, and the like. Of these, —$(CH_2)_6$— is preferable from the standpoint of obtaining a multilayer coating film with excellent metallic luster.

The $C_{1-3}$ alkylene group contained in the "$C_{1-3}$ alkylene-$C_{3-8}$ cycloalkylene-$C_{1-3}$ alkylene group" represented by R is a $C_{1-3}$ (preferably $C_1$) linear or branched (preferably linear) alkylene group. Examples include methylene, ethylene, and propylene (including n-propylene and isopropylene) groups.

The two "$C_{1-3}$ alkylene" groups contained in the "$C_{1-3}$ alkylene-$C_{3-8}$ cycloalkylene-$C_{1-3}$ alkylene group" may be the same or different (and are preferably the same).

The $C_{3-8}$ cycloalkylene group contained in the "$C_{1-3}$ alkylene-$C_{3-8}$ cycloalkylene-$C_{1-3}$ alkylene group" is a divalent hydrocarbon group obtained by removing two hydrogen atoms from a $C_{3-8}$ (preferably $C_{5-7}$, more preferably $C_6$) cycloalkane. Examples of $C_{3-8}$ cycloalkylene groups include 1,1-cyclopropylene, 1,2-cyclopropylene, 1,1-cyclobutylene, 1,2-cyclobutylene, 1,3-cyclobutylene, 1,2-cyclopentylene, 1,3-cyclopentylene, 1,1-cyclohexylene, 1,2-cyclohexylene, 1,3-cyclohexylene, 1,4-cyclohexylene, 1,3-cycloheptylene, and 1,4-cyclooctylene.

The $C_{1-3}$ alkylene-$C_{3-8}$ cycloalkylene-$C_{1-3}$ alkylene group may be, for example, a divalent substituent in which a $C_{1-3}$ alkylene group described above, a $C_{3-8}$ cycloalkylene group described above, and a $C_{1-3}$ alkylene group described above are bonded in this order. Specific examples thereof include methylene-1,2-cyclopropylene-methylene, methylene-1,2-cyclopropylene-ethylene, ethylene-1,2-cyclopropylene-ethylene, methylene-1,3-cyclobutylene-methylene, methylene-1,3-cyclopentylene-methylene, methylene-1,1-cyclohexylene-methylene, methylene-1,3-cyclohexylene-methylene, methylene-1,4-cyclohexylene-methylene, ethylene-1,4-cyclohexylene-ethylene, methylene-1,4-cyclohexylene-ethylene, propylene-1,4-cyclohexylene-propylene, methylene-1,3-cycloheptylene-methylene, methylene-1,4-cyclooctylene-methylene, and the like. From the standpoint of chipping resistance, methylene-1,4-cyclohexylene-methylene is preferred.

Examples of the polyester polyols include compounds obtained by polycondensing dicarboxylic acids (or dicarboxylic acid anhydrides), such as adipic acid, succinic acid, sebacic acid, glutaric acid, maleic acid, fumaric acid, and phthalic acid, with the low-molecular-weight polyols, such as ethylene glycol, propylene glycol, 1,4-butanediol, 1,6-hexanediol, 1,8-octamethylenediol, and neopentyl glycol, under conditions such that hydroxy groups are present in excess. Specific examples thereof include ethylene glycol-adipic acid condensation products, butanediol-adipic acid condensation products, hexamethylene glycol-adipic acid condensation products, ethylene glycol-propylene glycol-adipic acid condensation products, and polylactonepolyols obtained by subjecting lactone to ring-opening polymerization using glycol as an initiator.

Examples of the polyether ester polyols include compounds obtained by adding ether group-containing polyols (e.g., the polyether polyol or diethylene glycol described above) or mixtures thereof with other glycols to dicarboxylic acids (or dicarboxylic acid anhydrides) as described above as examples of polyester polyols and then reacting alkylene oxides therewith, such as polytetramethylene glycol-adipic acid condensation products.

The polyol component preferably contains a polycarbonate polyol from the standpoint of coating surface smoothness. The content of the polycarbonate polyol is preferably 50 to 100 mass %, and more preferably 70 to 100 mass %, based on the total solids content of the polyol component.

Examples of the active hydrogen group in the compound containing both an active hydrogen group and an ion-forming group include a hydroxy group, an amino group, an imino group, and a urea group. Examples of the ion-forming group include a carboxy group and a sulfone group.

Examples of the compound containing both an active hydrogen group and an ion-forming group include compounds containing at least two hydroxy groups and at least one carboxy group per molecule, compounds containing at least two hydroxy groups and at least one sulfonic acid group per molecule, compounds containing at least two amino groups and at least one carboxy group per molecule, and the like. These may be used singly, or in a combination of two or more.

Of these, the compound containing both an active hydrogen group and an ion-forming group is preferably a compound containing at least two hydroxy groups and at least one carboxy group per molecule or a compound containing at least two hydroxy groups and at least one sulfonic acid group per molecule. In the present invention, the compounds containing both at least two hydroxy groups and an ion-forming group, such as a compound containing at least two hydroxy groups and at least one carboxy group per molecule and a compound containing at least two hydroxy groups and at least one sulfonic acid group per molecule, are included in the polyol component.

Examples of the compounds containing at least two hydroxy groups and at least one carboxy group per molecule include alkanolcarboxylic acid compounds, such as dimethylolpropionic acid, dimethylolacetic acid, dimethylolbutanoic acid, dimethylolheptanoic acid, dimethylolnonanoic acid, and dihydroxybenzoic acid; and half-ester compounds of polyoxypropylene triol with maleic anhydride and/or phthalic anhydride.

Examples of the compound containing at least two hydroxy groups and at least one sulfonic acid group per molecule include 2-sulfonic acid-1,4-butanediol, 5-sulfonic acid-di-p-hydroxyethyl isophthalate, and N,N-bis(2-hydroxyethyl)aminoethylsulfonic acid.

The compound containing both an active hydrogen group and an ion-forming group is particularly preferably a compound containing at least two hydroxy groups and at least one carboxy group per molecule, from the standpoint of the flexibility of the resulting coating film.

The amount of the compound containing both an active hydrogen group and an ion-forming group above is preferably 1 to 10 mass %, more preferably 1 to 7 mass %, and even more preferably 1 to 5 mass %, based on the total amount of the compounds constituting the polyurethane resin emulsion (A-1), from the standpoint of aqueous dispersion stability and the water resistance etc. of the resulting coating film.

The production method for the polyurethane resin emulsion (A-1) is not particularly limited and may be a conventionally known method. Examples of the production method include a method comprising subjecting the polyisocyanate component, the polyol component, and optionally the compound containing both an active hydrogen group and an ion-forming group to a urethanization reaction in an organic solvent to synthesize a prepolymer, and adding deionized water optionally with a neutralizing agent for ion-forming groups to the obtained prepolymer to perform water dispersion (emulsification) and optionally a chain extension reaction and solvent removal, thus obtaining the polyurethane resin emulsion (A-1).

A catalyst can be used for the above urethanization reaction of the polyisocyanate component and the polyol component, if necessary.

Examples of the catalyst include carboxylic acid bismuth compounds such as tris(2-ethylhexanoic acid) bismuth (III); organic tin compounds such as dibutyltin dilaurate, dibutyltin dioctoate, and stannous octoate; and tertiary amine compounds such as triethylamine and triethylenediamine.

The urethanization reaction is preferably performed at 50 to 120° C.

The organic solvent may be an organic solvent that is inert to isocyanate groups and that does not impair the urethanization reaction. Examples of the organic solvents include aromatic hydrocarbon solvents such as toluene and xylene; ester solvents such as ethyl acetate and butyl acetate; and ketone solvents such as acetone and methyl ethyl ketone. Among these, ketone solvents and ester solvents can be preferably used from the standpoint of aqueous dispersion stability.

The neutralizing agent is not particularly limited as long as it can neutralize ion-forming groups. Examples of basic compounds for neutralization include organic amines, such as ammonia, diethylamine, ethylethanolamine, diethanolamine, triethanolamine, monoethanolamine, monopropanolamine, isopropanolamine, ethylaminoethylamine, hydroxyethylamine, triethylamine, tributylamine, dimethylethanolamine, and diethylenetriamine; and alkali metal hydroxides, such as sodium hydroxide and potassium hydroxide. These neutralizing agents can be used singly, or in a combination of two or more.

Among the basic compounds, organic amines are preferable from the standpoint of water resistance of the resulting coating film when applied to the paint composition.

These neutralizing agents are preferably used in an amount such that the aqueous dispersion of the polyurethane resin emulsion (A-1) has a final pH in the range of about 6.0 to 9.0.

When added, the neutralizing agent is suitably used in an amount of 0.1 to 1.5 equivalents, and preferably 0.3 to 1.2 equivalents, relative to acid groups such as a carboxy group.

The aqueous dispersion can be obtained by performing dispersion using a commonly used stirrer. To obtain a uniform aqueous dispersion of finer particles, homomixers, homogenizers, dispersers, line mixers, etc., can be used.

When a chain extension reaction of the urethane prepolymer is performed (a higher molecular weight is obtained), a chain extender other than water may be added, if necessary, to react the urethane prepolymer with the chain extender. The chain extender may be a known chain extender having active hydrogen. Specific examples include diamine compounds, such as ethylenediamine, hexamethylenediamine, cyclohexanediamine, cyclohexylmethanediamine, and isophoronediamine; triamine compounds such as diethylenetriamine; hydrazine; and the like.

From the standpoint of enhancing the degree of chain extension, trifunctional or higher amine compounds, such as diethylenetriamine or like triamine compounds, can be suitably used. From the standpoint of flexibility of the resulting coating film, diamine compounds, such as ethylenediamine, can be suitably used.

In order to introduce a reactive functional group, a compound containing at least one amine, such as hydroxyethylaminoethylamine, and at least one hydroxy group, per molecule can also be suitably used.

The ratio of the content of the polyol component and the content of the polyisocyanate component in the polyurethane resin emulsion (A-1) is such that the molar ratio of the active hydrogen group of the polyol component/the isocyanate group of the polyisocyanate component is preferably 1/1.01 to 1/3.0, and more preferably 1/1.05 to 1/2.0, from the standpoint of manufacturability etc.

To stabilize the dispersibility of the polyurethane resin emulsion (A-1), one or more emulsifiers, such as surfactants, may be used. The particle size of the emulsifiers is not particularly limited and is preferably 1 μm or less, and more preferably 500 nm or less to maintain an excellent dispersion state.

Examples of usable emulsifiers include known surfactants used in urethane resin emulsions, such as anionic surfactants, nonionic surfactants, cationic surfactants, amphoteric surfactants, polymeric surfactants, and reactive surfactants. Among these surfactants, anionic surfactants, nonionic surfactants, and cationic surfactants are preferable because they are inexpensive, and excellent emulsification can be obtained.

Examples of anionic surfactants include sodium dodecyl sulfate, potassium dodecyl sulfate, ammonium dodecyl sulfate and like alkyl sulfates; sodium dodecyl polyglycol ether sulfate; sodium sulforicinoleate; alkali metal salts of sulfonated paraffin, ammonium salts of sulfonated paraffin, and like alkyl sulfonates; sodium laurate, triethanolamine oleate, triethanolamine abietate, and like fatty acid salts; sodium benzene sulfonate, alkali metal sulfates of alkali phenol hydroxyethylene, and like alkylarylsulfonates; higher alkylnaphthalenesulfonates; naphthalenesulfonic acid-formalin condensates; dialkyl sulfosuccinates; polyoxyethylene alkylsulfates; and polyoxyethylene alkylarylsulfates.

Examples of nonionic surfactants include $C_1$-$C_{18}$ alcohol-ethylene oxide and/or propylene oxide adducts; alkylphenol-ethylene oxide and/or propylene oxide adducts; and alkylene glycol and/or alkylene diamine-ethylene oxide and/or propylene oxide adducts.

Examples of $C_1$-$C_{18}$ alcohols forming the nonionic surfactants include methanol, ethanol, propanol, 2-propanol, butanol, 2-butanol, tertiary butanol, amyl alcohol, isoamyl alcohol, tertiary amyl alcohol, hexanol, octanol, decane alcohol, lauryl alcohol, myristyl alcohol, palmitylalcohol, and stearyl alcohol. Examples of alkylphenols include phenol, methylphenol, 2,4-di-tertiary butylphenol, 2,5-di-tertiary butylphenol, 3,5-di-tertiary butylphenol, 4-(1,3-tetramethylbutyl)phenol, 4-isooctylphenol, 4-nonylphenol, 4 tertiary octylphenol, 4-dodecylphenol, 2-(3,5-dimethylheptyl)phenol, 4-(3,5-dimethylheptyl)phenol, naphthol, bisphenol A. and bisphenol F. Examples of alkylene glycols include ethylene glycol, 1,2-propanediol, 1,3-propanediol, 2 methyl-1,3-propanediol, 2-butyl-2-ethyl-1,3-propanediol, 1,4 butanediol, neopentyl glycol, 1,5-pentanediol, 3-methyl-1,5-pentanediol, 2,4-diethyl-1,5-pentanediol, and 1,6-hexanediol. Examples of alkylene diamines include these alkylene glycols in which alcoholic hydroxy groups are substituted with amino groups. Further, the ethylene oxide and propylene oxide adducts may be random or blocked adducts.

Examples of cationic surfactants include primary to tertiary amine salts, pyridinium salts, alkyl pyridinium salts, alkyl halide quaternary ammonium salts, and like quaternary ammonium salts.

Although these emulsifiers may be used in any amount with no particular limitation, the mass ratio of the emulsifier to the urethane resin is preferably in the range of 0.05:1 to 0.3:1, and more preferably 0.05:1 to 0.2:1. This is because when the emulsifier/urethane resin ratio is less than 0.05, the dispersibility may not be sufficient, whereas when the emulsifier/urethane resin ratio exceeds 0.3, properties such as water resistance, strength, and elongation at break of the coating film obtained from the aqueous paint composition may be reduced.

Further, the solids content of the polyurethane resin emulsion (A-1) may be any value, with no particular limitation. The solids content is preferably 10 to 50 mass % to achieve excellent dispersibility and coating performance. The solids content is more preferably 20 to 40 mass %.

The weight average molecular weight of the urethane resin dispersed in the polyurethane resin emulsion (A-1) is 2000 to 50000, and preferably 3000 to 40000 from the standpoint of smoothness of the resulting coating film. The hydroxy value may be any value, with no particular limitation. The hydroxy value is expressed in consumption (mg) of KOH per gram of the resin, and is typically 0 to 100 mgKOH/g.

The base paint (X) contains the polyurethane resin (A) in an amount of preferably 5 to 60 parts by mass, more preferably 10 to 40 parts by mass, and even more preferably 15 to 30 parts by mass, based on 100 parts by mass (solids content) of the resin contained in the base paint (X), from the standpoint of obtaining a multilayer coating film with excellent metallic luster.

Alcohol (B) Containing 6 to 12 Carbon Atoms

The alcohol (B) is not particularly limited as long as the number of carbon atoms is 6 to 12. From the standpoint of obtaining a multilayer coating film with excellent metallic luster, the number of carbon atoms is more preferably 7 to 11. If the number of carbon atoms is less than 6, the viscosity of the base coating film decreases, and the base coating film is mixed with the effect coating film to form a mixed layer, resulting in an unsatisfactory appearance of the coating film. If the number of carbon atoms is more than 12, the viscosity of the base coating film increases, and the smoothness is deteriorated, resulting in an unsatisfactory appearance of the coating film.

Examples of the alcohol (B) containing 6 to 12 carbon atoms include linear or branched aliphatic alcohols. Specific examples include hexanol, heptanol, octanol, nonanol, decanol, undecanol, and dodecanol, and aromatic alcohols containing 6 to 12 carbon atoms, such as phenol. These may be saturated or unsaturated.

These may be used singly, or in a combination of two or more. Of these, the alcohol (B) is particularly preferably hexanol or octanol.

The base paint (X) contains the alcohol (B) in an amount of preferably 5 to 45 parts by mass, more preferably 10 to 40 parts by mass, and even more preferably 15 to 30 parts by mass, based on 100 parts by mass (solids content) of the resin contained in the base paint (X), in terms of obtaining a multilayer coating film with excellent metallic luster.

Organic Solvent (C) Having an HLB of 7 to 9

The organic solvent (C) having an HLB value of 7 to 9 for use is not particularly limited as long as the HLB value is 7 to 9. The HLB value is more preferably 7.1 to 8.5, from the standpoint of obtaining a multilayer coating film with excellent metallic luster. If the HLB value is smaller than 7, the viscosity of the base coating film increases, and the smoothness is deteriorated, resulting in an unsatisfactory appearance of the coating film. If the HLB value is more than 9, the polarity of the base coating film increases, and the base coating film is mixed with the effect coating film to form a mixed film, resulting in an unsatisfactory appearance of the coating film.

The HLB value is a value expressing the degree of affinity of compounds with water and oil (an organic compound insoluble in water). HLB is an acronym for Hydrophile-Lipophile Balance. In the present invention, the HLB value is calculated using the following Griffin equation (1) based on a mass fraction:

$$HLB=20(MH/M) \quad (1),$$

wherein MH represents the molecular weight of the hydrophilic group moiety, and M represents the molecular weight of the compound.

The organic solvent (C) is, for example, at least one member selected from the group consisting of propylene glycol monomethyl ether, ethylene glycol monobutyl ether, dipropylene glycol monomethyl ether, diethylene glycol monobutyl ether, and tripropylene glycol monomethyl ether. These may be used singly, or in a combination of two or more. The organic solvent (C) is particularly preferably dipropylene glycol monomethyl ether, diethylene glycol monobutyl ether, or tripropylene glycol monomethyl ether, and more preferably dipropylene glycol monomethyl ether.

The base paint (X) contains the organic solvent (C) in an amount of preferably 3 to 22 parts by mass, more preferably 5 to 20 parts by mass, and even more preferably 8 to 18 parts by mass, based on 100 parts by mass (solids content) of the resin contained in the base paint (X), from the standpoint of obtaining a multilayer coating film with excellent metallic luster.

In the base paint (X), the mass ratio of the content of the alcohol (B) to the content of the organic solvent (C), i.e., (B)/(C), is preferably 0.7 to 3, more preferably 1.0 to 2.5, and even more preferably 1.3 to 2, from the standpoint of obtaining a multilayer coating film with excellent metallic luster.

Polyester Resin (D)

In addition to the components (A) to (C), the base paint (X) preferably further contains a polyester resin (D) having a number average molecular weight of 1500 to 10000, preferably 1800 to 8000, and even more preferably 2000 to 6000, from the standpoint of obtaining a multilayer coating film with excellent metallic luster.

The polyester resin (D) is not particularly limited as long as it is commonly used in paints, and is preferably those that are dissolved or dispersed in water. The polyester resin (D) is typically provided in the form of an aqueous solution or aqueous dispersion.

The polyester resin (D) is preferably an acrylic-modified polyester, from the standpoint of obtaining a multilayer coating film with excellent metallic luster. The acrylic-modified polyester is preferably an aqueous dispersion.

The aqueous dispersion of acrylic-modified polyester resin can be obtained by dispersing an acrylic-modified polyester resin in water. The acrylic-modified polyester resin can be obtained by known methods without any particular limitation. For example, the acrylic-modified polyester resin can be obtained by polymerizing a mixture of a radically-polymerizable-unsaturated-group-containing polyester resin and a polymerizable unsaturated monomer. The acrylic-modified polyester resin can alternatively be obtained by an esterification reaction of resins, i.e., polyester resin and acrylic resin.

The method of obtaining an acrylic-modified polyester resin by polymerizing a mixture of a radically-polymerizable-unsaturated-group-containing polyester resin and a polymerizable unsaturated monomer refers to a method in which a polymerizable unsaturated monomer is polymerized using radically polymerizable unsaturated groups in a polyester resin as graft points to subject the polyester resin to acrylic modification. The method of obtaining a radically-polymerizable-unsaturated-group-containing polyester resin is not particularly limited. For example, after obtaining a polyester resin by a known method, terminal hydroxy groups may be reacted with acid-anhydride-containing unsaturated monomers to add graft points to the terminal of the polyester resin. Alternatively, a radically-polymerizable-unsaturated-group-containing polyester resin can be produced by esterification or transesterification of an alcohol component and an acid component containing a polybasic acid having a polymerizable unsaturated group. From the standpoint of obtaining a multilayer coating film with excellent metallic luster, the latter method is preferred, i.e., esterification or transesterification of an alcohol component and an acid component containing a polybasic acid having a polymerizable unsaturated group. Of these, it is particularly preferable to use an acid component containing an acid-anhydride-group-containing unsaturated monomer as the polybasic acid having a polymerizable unsaturated group, from the standpoint of obtaining a multilayer coating film with excellent metallic luster.

The acid-anhydride-group-containing unsaturated monomer refers to a compound having one acid anhydride group and one radically polymerizable unsaturated group per molecule. Specific examples include maleic anhydride, itaconic anhydride, fumaric anhydride, citraconic anhydride, mesaconic anhydride, tetrahydrophthalic anhydride, 2-pentene diacid anhydride, methylene succinic anhydride, allylmalonic anhydride, isopropylidene succinic anhydride, 2,4-hexadiene diacid anhydride, acetylene dicarboxylic anhydride, 4-cyclohexene-1,2-dicarboxylic anhydride, and other unsaturated dicarboxylic anhydrides. Of these, maleic anhydride is preferred from the standpoint of obtaining a multilayer coating film with excellent metallic luster.

Examples of acid components other than the acid-anhydride-group-containing unsaturated monomer include aliphatic polybasic acid, alicyclic polybasic acid, and aromatic polybasic acid.

The aliphatic polybasic acid typically refers to an aliphatic compound having at least two carboxy groups per molecule, an anhydride of the aliphatic compound, or an esterified product of the aliphatic compound. Examples of the aliphatic polybasic acid include aliphatic polycarboxylic acids, succinic acid, glutaric acid, adipic acid, pimelic acid, suberic acid, azelaic acid, sebacic acid, undecanedioic acid, dodecanedioic acid, brassylic acid, octadecanedioic acid, citric acid, and butanetetracarboxylic acid; anhydrides of these aliphatic polycarboxylic acids; and esterified products of these aliphatic polycarboxylic acids with lower alkyl having about 1 to 4 carbon atoms. These aliphatic polybasic acids can be used singly, or in a combination of two or more.

The aliphatic polybasic acid for use is particularly preferably adipic acid and/or adipic anhydride, from the standpoint of obtaining a multilayer coating film with excellent metallic luster.

The alicyclic polybasic acid typically refers to a compound having at least one alicyclic structure and at least two carboxy groups per molecule, an acid anhydride of the compound, or an esterified product of the compound. The alicyclic structure is mainly a 4- to 6-membered ring structure. Examples of the alicyclic polybasic acid include alicyclic polycarboxylic acids, such as 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexane tricarboxylic acid, and 1,3,5-cyclohexane tricarboxylic acid; anhydrides of the alicyclic polycarboxylic acids; and esterified products of the alicyclic polycarboxylic acids with lower alkyl having about 1 to 4 carbon atoms. These alicyclic polybasic acids can be used singly, or in a combination of two or more.

The alicyclic polybasic acid for use is preferably 1,2-cyclohexanedicarboxylic acid, 1,2-cyclohexanedicarboxylic anhydride, 1,3-cyclohexanedicarboxylic acid, 1,4-cyclohexanedicarboxylic acid, or 4-cyclohexene-1,2-dicarboxylic acid, from the standpoint of obtaining a multilayer coating film with excellent metallic luster. Of these, 1,2-cyclohexanedicarboxylic acid and/or 1,2-cyclohexanedicarboxylic anhydride are more preferably used.

The aromatic polybasic acid typically refers to an aromatic compound having at least two carboxy groups per molecule, or an esterified product of the aromatic compound. Examples include aromatic polycarboxylic acids, such as phthalic acid, isophthalic acid, terephthalic acid, naphthalene dicarboxylic acid, 4,4'-biphenyl dicarboxylic acid, trimellitic acid, and pyromellitic acid; and esterified products of the aromatic polycarboxylic acids with lower alkyl having about 1 to 4 carbon atoms. These aromatic polybasic acids can be used singly, or in a combination of two or more.

The aromatic polybasic acid for use is preferably phthalic acid, isophthalic acid, or trimellitic acid.

An acid component other than the aliphatic polybasic acids, alicyclic polybasic acids, and aromatic polybasic acids can also be used. Such an acid component is not particularly limited. Examples include fatty acids, such as coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, and safflower oil fatty acid; monocarboxylic acids, such as lauric acid, myristic acid, palmitic acid, stearic acid, oleic acid, linoleic acid, linolenic acid, benzoic acid, p-tert-butyl benzoic acid, cyclohexanoic acid, and 10-phenyloctadecanoic acid; and hydroxycarboxylic acids, such as lactic acid, 3-hydroxybutanoic acid, and 3-hydroxy-4-ethoxybenzoic acid. These acid components can be used singly, or in a combination of two or more.

The alcohol component for use in the production of acrylic-modified polyester resin is preferably a polyhydric alcohol containing at least two hydroxy groups per molecule. Examples of the polyhydric alcohol include dihydric alcohols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 2-methyl-1,3-propanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexane dimethanol, tricyclodecane dimethanol, neopentyl glycol hydroxypivalate, hydrogenated bisphenol A, hydrogenated bisphenol F, and dimethylol propionic acid; polylactone diols obtained by adding lactone compounds, such as ε-caprolactone, to these dihydric alcohols; ester diol compounds such as bis(hydroxyethyl) terephthalate; polyether diol compounds such as alkylene oxide adducts of bisphenol A, polyethylene glycol, polypropylene glycol, and polybutylene glycol; trihydric or higher hydric alcohols such as glycerol, trimethylol ethane, trimethylol propane, diglycerol, triglycerol, 1,2,6-hexanetriol, pentaerythritol, dipentaerythritol, tris(2-hydroxyethyl) isocyanuric acid, sorbitol, and mannitol; polylactone polyol compounds obtained by adding lactone compounds, such as ε-caprolactone, to these trihydric or higher hydric alcohols; and esterified products of glycerol fatty acids.

An alcohol component other than these polyhydric alcohols can also be used. Such an alcohol component is not particularly limited, and examples include monohydric alcohols such as methanol, ethanol, propyl alcohol, butyl alcohol, stearyl alcohol, and 2-phenoxy ethanol; and alcohol compounds obtained by reacting an acid with a monoepoxy compound, such as propylene oxide, butylene oxide, and Cardura E10 (trade name, produced by Hexion Specialty Chemicals, a glycidyl ester of synthetic, highly branched, saturated fatty acid).

Examples of other methods of obtaining a radically-polymerizable-unsaturated-group-containing polyester resin include a method in which an unsaturated fatty acid, such as oleic acid and myristic acid, is used as part of the acid component. This method uses a radically polymerizable unsaturated group in an unsaturated fatty acid as graft points.

The aqueous dispersion of the acrylic-modified polyester resin is such that the content of the alicyclic polybasic acid in the acid component, which is a starting material of the polyester portion, is preferably 20 to 100 mol %, more preferably 25 to 95 mol %, and even more preferably 30 to 90 mol %, based on the total amount of the acid component, from the standpoint of obtaining a multilayer coating film with excellent metallic luster. In particular, the alicyclic polybasic acid is preferably 1,2-cyclohexanedicarboxylic acid and/or 1,2-cyclohexanedicarboxylic acid anhydride, from the standpoint of obtaining a multilayer coating film with excellent metallic luster.

The method for producing a radically-polymerizable-unsaturated-group-containing polyester resin is not particularly limited and may be a commonly used method. For example, a radically-polymerizable-unsaturated-group-containing polyester resin can be produced by heating the acid component and the alcohol component in a nitrogen stream at 150 to 250° C. for 5 to 10 hours to perform esterification or transesterification of the acid component and the alcohol component.

When performing esterification or transesterification of the acid component and the alcohol component, these components may be added to a reaction vessel at one time, or one component or both components may be added in several portions or in a continuous manner. After synthesis of a radically-polymerizable-unsaturated-group-containing polyester resin, the obtained radically-polymerizable-unsaturated-group-containing polyester resin may be half-esterified to prepare a polyester resin containing radically polymerizable unsaturated groups, carboxy groups, and hydroxy groups. Alternatively, after synthesis of a polyester resin containing radically polymerizable unsaturated groups and carboxy groups, an alcohol component as mentioned above may be added to prepare a polyester resin containing radically polymerizable unsaturated groups, carboxy groups, and hydroxy groups.

In the esterification or transesterification, a known catalyst, such as dibutyltin oxide, antimony trioxide, zinc acetate, manganese acetate, cobalt acetate, calcium acetate, lead acetate, tetrabutyl titanate, and tetraisopropyl titanate, may be used to facilitate the reaction.

The radically-polymerizable-unsaturated-group-containing polyester resin can be modified with a fatty acid, fat and oil, a monoepoxy compound, a polyisocyanate compound, or the like, during or after the preparation of the resin.

Examples of the fatty acid include coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, and safflower oil fatty acid.

Examples of the fat and oil include fatty acid oils of these fatty acids.

Preferable examples of the monoepoxy compound include Cardura E10 (trade name, produced by Hexion Specialty Chemicals, a glycidyl ester of synthetic, highly branched, saturated fatty acid).

Examples of the polyisocyanate compound include aliphatic diisocyanate compounds, such as lysine diisocyanate, hexamethylene diisocyanate, and trimethylhexane diisocyanate; alicyclic diisocyanate compounds, such as hydrogenated xylylene diisocyanate, isophorone diisocyanate, methylcyclohexane-2,4-diisocyanate, methylcyclohexane-2,6-diisocyanate, 4,4'-methylenebis(cyclohexylisocyanate), and 1,3-(isocyanatomethyl)cyclohexane; aromatic diisocyanate compounds, such as tolylene diisocyanate, xylylene diisocyanate, and diphenylmethane diisocyanate; organic polyisocyanates themselves, such as trivalent or higher-valent polyisocyanates including lysine triisocyanate; adducts of these organic polyisocyanates with a polyhydric alcohol, a low-molecular-weight polyester resin, water, etc.; and cyclopolymers of these organic polyisocyanates (e.g., isocyanurate), and biuret adducts of these organic polyisocyanates. These polyisocyanate compounds may be used singly, or in a combination of two or more.

The polymerizable unsaturated monomer to be mixed and polymerized with the radically-polymerizable-unsaturated-group-containing polyester resin obtained as described above may be, for example, the following monomers (i) to (xx). These polymerizable unsaturated monomers may be used singly, or in a combination of two or more.

- (i) Alkyl or cycloalkyl (meth)acrylate: for example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth) acrylate, 2-ethylhexyl (meth)acrylate, nonyl (meth) acrylate, tridecyl (meth)acrylate, lauryl (meth)acrylate, stearyl (meth)acrylate, isostearyl (meth)acrylate, cyclohexyl (meth)acrylate, methyl cyclohexyl (meth)acrylate, t-butyl cyclohexyl (meth)acrylate, cyclododecyl (meth)acrylate, and tricyclodecanyl(meth)acrylate;
- (ii) Polymerizable unsaturated monomers having an isobornyl group: isobornyl (meth)acrylate etc.;
- (iii) Polymerizable unsaturated monomers having an adamantyl group: adamantyl (meth)acrylate etc.;
- (iv) Polymerizable unsaturated monomers having a tricyclodecenyl group: tricyclodecenyl (meth)acrylate etc.;
- (v) Aromatic-ring-containing polymerizable unsaturated monomers: benzyl (meth)acrylate, styrene, α-methyl styrene, vinyl toluene, etc.;
- (vi) Polymerizable unsaturated monomers having an alkoxy silyl group: vinyltrimethoxysilane, vinyltriethoxysilane, vinyltris(2-methoxyethoxy) silane, γ-(meth)acryloyloxypropyl trimethoxysilane, γ-(meth)acryloyloxypropyl triethoxysilane, etc.;
- (vii) Polymerizable unsaturated monomers having a fluorinated alkyl group: perfluoroalkyl (meth)acrylate, such as perfluorobutylethyl (meth)acrylate and perfluorooctylethyl (meth)acrylate, and fluoroolefins,
- (viii) Polymerizable unsaturated monomers having a photopolymerizable functional group, such as a maleimide group;
- (ix) Vinyl compounds: N-vinyl pyrrolidone, ethylene, butadiene, chloroprene, vinyl propionate, vinyl acetate, etc.;
- (x) Carboxy-containing polymerizable unsaturated monomers: (meth)acrylic acid, maleic acid, crotonic acid, β-carboxy ethyl acrylate, etc.;
- (xi) Hydroxy-containing polymerizable unsaturated monomers: monoester compounds of (meth)acrylic acid, such as 2-hydroxyethyl (meth)acrylate, 2-hydroxypropyl (meth)acrylate, 3-hydroxypropyl (meth) acrylate, and 4-hydroxybutyl (meth)acrylate, with a dihydric alcohol having 2 to 8 carbon atoms; ε-caprolactone modified products of monoester compounds of (meth)acrylic acid and a dihydric alcohol having 2 to 8 carbon atoms; N-hydroxymethyl (meth)acrylamide; allyl alcohols; (meth)acrylates having a hydroxy-terminated polyoxyethylene chain, etc.;
- (xii) Nitrogen-containing polymerizable unsaturated monomers: (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, methylene bis(meth)acrylamide, ethylene bis(meth)acrylamide, adducts of glycidyl (meth)acrylate and amine compounds etc.;
- (xiii) Polymerizable unsaturated monomers having two or more polymerizable unsaturated groups per molecule: allyl (meth)acrylate, 1,6-hexanediol di(meth)acrylate, etc.;
- (xiv) Epoxy-containing polymerizable unsaturated monomers: glycidyl (meth)acrylate, O-methyl glycidyl (meth)acrylate, 3,4-epoxycyclohexylmethyl (meth) acrylate, 3,4-epoxycyclohexyl ethyl (meth)acrylate, 3,4-epoxycyclohexylpropyl (meth)acrylate, allyl glycidyl ether, etc.;
- (xv) (Meth)acrylates having an alkoxy-terminated polyoxyethylene chain;
- (xvi) Sulfonic acid group-containing polymerizable unsaturated monomers: 2-acrylamide-2-methylpropanesulfonic acid, 2-sulfoethyl (meth)acrylate, allylsulfonic acid, 4-styrenesulfonic acid, etc.; sodium salts and ammonium salts of these sulfonic acids etc.;
- (xvii) Phosphoric group-containing polymerizable unsaturated monomers: acid phosphoxyethyl (meth) acrylate, acid phosphoxypropyl (meth)acrylate, acid phosphoxypoly(oxyethylene) glycol (meth)acrylate, acid phosphoxypoly(oxypropylene) glycol (meth)acrylate, etc.;
- (xviii) Polymerizable unsaturated monomers having an UV-absorbing functional group: 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy)benzophenone, 2-(2'-hydroxy-5'-methacryloyloxyethylphenyl)-2H-benzotriazole, etc.;
- (xix) UV-stable polymerizable unsaturated monomers: 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-crotonoyl-4-crotonoyloxy-2,2,6,6-tetramethylpiperidine, etc.;

(xx) Polymerizable unsaturated monomers having a carbonyl group: acrolein, diacetone acrylamide, diacetone methacrylamide, acetoacetoxyethyl methacrylate, formylstyrol, $C_{4-7}$ vinyl alkyl ketone (e.g., vinyl methyl ketone, vinyl ethyl ketone, and vinyl butyl ketone), etc.

In the present specification, the term "polymerizable unsaturated group" refers to an unsaturated group that can undergo radical polymerization. Examples of polymerizable unsaturated groups include a vinyl group, and a (meth) acryloyl group.

In the present specification, the term "(meth)acrylate" means acrylate or methacrylate. The term "(meth)acrylic acid" means acrylic acid or methacrylic acid. The term "(meth)acryloyl" means acryloyl or methacryloyl. The term "(meth)acrylamide" means acrylamide or methacrylamide.

The polymerizable unsaturated monomer preferably, at least partially, include the (x) carboxy-containing polymerizable unsaturated monomer and the (v) aromatic ring-containing polymerizable unsaturated monomer, from the standpoint of ease of grafting with the polyester resin and the stability of the aqueous dispersion of the acrylic-acid-modified polyester resin.

In this case, the proportions of (x) carboxy-containing polymerizable unsaturated monomer and (v) aromatic ring-containing polymerizable unsaturated monomer are preferably as follows, based on the total mass of the polymerizable unsaturated monomers.

The proportion of the (x) carboxy-containing polymerizable unsaturated monomer is preferably 20 to 50 mass %, more preferably 25 to 45 mass %, and particularly preferably 30 to 40 mass %.

The proportion of the (v) aromatic ring-containing polymerizable unsaturated monomer is preferably 10 to 60 mass %, more preferably 15 to 55 mass %, and particularly preferably 20 to 50 mass %.

The acrylic-modified polyester resin can be obtained, for example, by copolymerizing the radically-polymerizable-unsaturated-group-containing polyester resin and the polymerizable unsaturated monomer according to a known method.

Specifically, for example, the acrylic-modified polyester resin can be obtained by adding a radically-polymerizable-unsaturated-group-containing polyester resin, a polymerizable unsaturated monomer, and a radical initiator, and optionally a chain transfer agent to a reaction vessel, and heating the mixture at 90 to 160° C. for 1 to 5 hours. If the heat generation is too large to easily control the temperature, only a radically-polymerizable-unsaturated-group-containing polyester resin may be added first to a reaction vessel, and the other starting materials may then be added slowly over time.

The polymerization initiator for use may be an organic peroxide-based polymerization initiator, an azo-based polymerization initiator, and the like. Examples of organic peroxide-based polymerization initiators include benzoyl peroxide, t-butylperoxy-2-ethylhexanoate, di-t-butyl peroxide, t-butyl peroxy benzoate, and t-amylperoxy-2-ethylhexanoate. Examples of azo-based polymerization initiators include azobis isobutyronitrile, and azobis dimethylvaleronitrile. Examples of chain transfer agents include α-methylstyrene dimer and mercaptans.

The amount of the polymerizable unsaturated monomer to be added is preferably 10 to 95 parts by weight, more preferably 30 to 90 parts by weight, and even more preferably 65 to 85 parts by weight, based on 100 parts by weight of the total of the radically-polymerizable-unsaturated-group-containing polyester resin and the polymerizable unsaturated monomer, from the standpoint of production stability of graft polymerization.

The acrylic-modified polyester resin has a hydroxy value of preferably 0 to 200 MgKOH/g, more preferably 10 to 100 mgKOH/g, and even more preferably 20 to 60 mgKOH/g, from the standpoint of obtaining a multilayer coating film with excellent metallic luster.

From the standpoint of smoothness, distinctness of image, water resistance, and adhesion of the resulting coating film, when the acrylic-modified polyester resin further contains a carboxy group, its acid value is preferably 55 mgKOH/g or less, more preferably 10 to 50 mgKOH/g, and even more preferably 20 to 30 mgKOH/g.

The acrylic-modified polyester resin has a number average molecular weight of preferably 1500 to 10000, more preferably 1800 to 8000, and even more preferably 2000 to 6000, from the standpoint of obtaining a multilayer coating film with excellent metallic luster.

In the present specification, the number average molecular weight and weight average molecular weight refer to values determined by converting the retention time (retention volume) measured with gel permeation chromatography (GPC) into a molecular weight of a polystyrene based on the retention time (retention volume) of a polystyrene standard with a known molecular weight measured under the same conditions. Specifically, an HLC-8120GPC gel permeation chromatograph analyzer (trade name, produced by Tosoh Corporation) is used, and four columns are used: TSKgel G4000HXL, TSKgel G3000HXL, TSKgel G2500HXL, and TSKgel G2000HXL (trade names, all produced by Tosoh Corporation). A differential refractometer is used as a detector, and measurement is performed under the conditions of mobile phase: tetrahydrofuran, measurement temperature: 40° C., and flow rate: 1 mL/min.

The acrylic-modified polyester resin synthesized as above can be neutralized and dispersed in water to obtain an aqueous resin dispersion. The neutralizing agent for use in neutralization may be preferably amines and ammonia. Typical examples of the amines include triethylamine, triethanolamine, dimethylethanolamine, diethylethanolamine, and morpholine. Of these, in particular, triethylamine and dimethylethanolamine are suitably used. The degree of neutralization of the acrylic-modified polyester resin is not particularly limited. It is desirable that the degree of neutralization usually falls within the range of 0.3 to 1.0 equivalents relative to the carboxy groups in the resin.

The aqueous medium in which the acrylic-modified polyester resin is dispersed may be water alone or a mixture of water and an organic solvent. The organic solvent may be any known organic solvent as long as it does not impair the stability of the acrylic-modified polyester resin in the aqueous medium.

The organic solvent is preferably an alcohol-based solvent, ether-based solvent, or the like. Specific examples include alcohol-based solvents such as n-butanol; ether-based solvents such as ethylene glycol monobutyl ether, ethylene glycol monoisopropyl ether, ethylene glycol monomethyl ether, propylene glycol monomethyl ether, diethylene glycol monoethyl ether; and the like. The organic solvent may also be an unsaturated organic solvent that does not mix with water, which is not listed above, as long as it does not impair the stability of the acrylic-modified polyester resin in the aqueous medium. Examples of these organic solvents include aromatic hydrocarbon-based solvents such as toluene and xylene, ester-based solvents such as ethyl acetate and butyl acetate, and ketone-based solvents such as methyl ethyl ketone and cyclohexanone. The amount of the organic solvent in the aqueous resin dispersion of the present invention is desirably 50 wt % or less in the aqueous medium from the standpoint of environmental protection.

The acrylic-modified polyester resin may be neutralized and dispersed in an aqueous medium according to a known method. Examples of the method include a method in which the acrylic-modified polyester resin is gradually added to an aqueous medium containing a neutralizing agent while stirring, a method in which the acrylic-modified polyester resin is neutralized with a neutralizing agent, after which an aqueous medium is added to the neutralized product while stirring, or the neutralized product is added to an aqueous medium while stirring.

When the base paint (X) contains the polyester resin (D), the polyester resin (D) may be contained in an amount of preferably 5 to 60 parts by mass, more preferably 10 to 40 parts by mass, and even more preferably 15 to 30 parts by mass, based on 100 parts by mass (solids content) of the resin contained in the base paint (X), from the standpoint of obtaining a multilayer coating film with excellent metallic luster.

Nonionic-Hydrophilic-Group-Containing Blocked Polyisocyanate Compound (E)

In addition to the components (A) to (C) described above, the base paint (X) preferably further contains a nonionic-hydrophilic-group-containing blocked polyisocyanate compound (E), from the standpoint of obtaining a multilayer coating film with excellent metallic luster.

The nonionic-hydrophilic-group-containing blocked polyisocyanate compound (E) (may be abbreviated below as "the blocked polyisocyanate compound (E)") is a compound in which some isocyanate groups in a polyisocyanate compound containing two or more isocyanate groups per molecule are modified with a nonionic hydrophilic group, and some or all of the remaining isocyanate groups are blocked with a blocking agent.

In the aqueous paint composition of the present invention, the blocked polyisocyanate compound (E) is dispersed or dissolved in an aqueous medium contained in the aqueous paint composition.

The blocked polyisocyanate compound (E) may be obtained, for example, by reacting the isocyanate groups of a polyisocyanate compound (e1) containing two or more isocyanate groups per molecule, an active hydrogen-containing compound (e2) having a nonionic hydrophilic group, and a blocking agent (e3).

When the isocyanate groups of the polyisocyanate compound (e1) containing two or more isocyanate groups per molecule (sometimes referred to below as "the polyisocyanate compound (e1)"), the active hydrogen-containing compound (e2) having a nonionic hydrophilic group (sometimes referred to below as "the active hydrogen-containing compound (e2)"), and the blocking agent (e3) are reacted, the order of the reactions of the polyisocyanate compound (e1), the active hydrogen-containing compound (e2), and the blocking agent (e3) is not particularly limited.

Specifically, the active hydrogen-containing compound (e2) may be first reacted with some of the isocyanate groups in the polyisocyanate compound (e1), and the remaining isocyanate groups may then be blocked with the blocking agent (e3). Alternatively, some of the isocyanate groups in the polyisocyanate compound (e1) may be blocked first with the blocking agent (e3), and the remaining isocyanate groups may then be reacted with the active hydrogen-containing compound (e2). Alternatively, the active hydrogen-containing compound (e2) and the blocking agent (e3) may be reacted at once with the isocyanate groups in the polyisocyanate compound (e1).

Polyisocyanate Compound (e1) Containing Two or More Isocyanate Groups Per Molecule The polyisocyanate compound (e1) containing two or more isocyanate groups per molecule is not particularly limited as long as it is a compound containing two or more isocyanate groups per molecule. Examples include aliphatic polyisocyanates, alicyclic polyisocyanates, aromatic-aliphatic polyisocyanates, aromatic polyisocyanates, derivatives thereof, and any combinations thereof.

Examples of the aliphatic polyisocyanates for use include the aliphatic polyisocyanates mentioned in the description of the polyurethane resin (A).

Examples of the alicyclic polyisocyanates for use include the alicyclic polyisocyanates mentioned in the description of the polyurethane resin (A).

Examples of the aromatic-aliphatic polyisocyanates for use may be the aromatic-aliphatic polyisocyanate mentioned in the description of the polyurethane resin (A).

Examples of the aromatic polyisocyanates for use include the aromatic polyisocyanates mentioned in the description of the polyurethane resin (A).

Examples of the derivatives for use include the derivatives mentioned in the description of the polyurethane resin (A).

The polyisocyanate compound (e1) is preferably an aliphatic diisocyanate, an alicyclic diisocyanate, or a derivative thereof to reduce the occurrence of yellowing during heating of the obtained nonionic-hydrophilic-group-containing blocked polyisocyanate compound (E), and is more preferably an aliphatic diisocyanate or a derivative thereof from the standpoint of flexibility of the resulting coating film.

The polyisocyanate compound (e1) may alternatively be a prepolymer formed by reacting the polyisocyanate and/or a derivative thereof with a compound that is reactive with the polyisocyanate under conditions such that the isocyanate groups are present in excess. Examples of the compound that is reactive with the polyisocyanate include compounds containing an active hydrogen group, such as a hydroxy group or an amino group. Specific examples include polyhydric alcohols, low-molecular-weight polyester resins, amine, water, and the like.

The polyisocyanate compound (e1) may be a polymer or copolymer of an isocyanate-group-containing polymerizable unsaturated monomer.

From the standpoint of reactivity of the obtained blocked polyisocyanate compound (E) and compatibility of the blocked polyisocyanate compound (E) with other paint components, the polyisocyanate compound (e1) has a number average molecular weight of preferably about 300 to 20000, more preferably about 400 to 8000, and even more preferably about 500 to 2000.

From the standpoint of reactivity of the obtained blocked polyisocyanate compound (E) and compatibility of the blocked polyisocyanate compound (E) with other paint components, the average number of isocyanate functional groups per molecule in the polyisocyanate compound (e1) is preferably about 2 to 100. From the standpoint of increasing reactivity of the blocked polyisocyanate compound (E), the average number of isocyanate functional groups is preferably about 3 or more. From the standpoint of preventing gelation during the production of the blocked polyisocyanate compound (E), the average number of isocyanate functional groups is preferably about 20 or less.

Active Hydrogen-Containing Compound (e2) Having a Nonionic Hydrophilic Group

Examples of the active hydrogen-containing compound (e2) having a nonionic hydrophilic group include active hydrogen-containing compounds having a polyoxyalkylene group. Examples of the polyoxyalkylene group include a polyoxyethylene group, a polyoxypropylene group, and any combinations thereof, such as a polyoxyethylene(oxypropylene) group. Of these, the active hydrogen-containing compound (e2) is preferably an active hydrogen-containing compound (e21) having a polyoxyethylene group, from the standpoint of storage stability of the blocked polyisocyanate compound (E).

The active hydrogen-containing compound (e21) having a polyoxyethylene group preferably has about 3 or more, more preferably about 5 to 100, and even more preferably about 8 to 45 consecutive oxyethylene groups (polyoxyethylene group), from the standpoint of, for example, storage stability of the obtained blocked polyisocyanate compound (E) and water resistance of the resulting coating film.

In addition to the consecutive oxyethylene groups, the active hydrogen-containing compound (e21) having a polyoxyethylene group may also have an oxyalkylene group other than oxyethylene groups. Examples of oxyalkylene groups other than oxyethylene groups include an oxypropylene group, oxybutylene group, and oxyhexylene group. In the active hydrogen-containing compound (e21) having a polyoxyethylene group, the molar ratio of oxyethylene groups relative to oxyalkylene groups is preferably about 20 to 100 mol %, and more preferably about 50 to 100 mol %, from the standpoint of storage stability of the obtained blocked polyisocyanate compound (E) after being dispersed in water. If the molar ratio of oxyethylene groups relative to oxyalkylene groups is less than about 20 mol %, hydrophilicity may not be sufficient, and the obtained nonionic-hydrophilic-group-containing blocked polyisocyanate compound (E) can have reduced storage stability.

The active hydrogen-containing compound (e2) having a nonionic hydrophilic group preferably has a number average molecular weight of about 200 to 2000 from the standpoint of storage stability of the obtained blocked polyisocyanate compound (E) and water resistance of the formed coating film. The number average molecular weight is more preferably about 300 or more, and even more preferably about 400, from the standpoint of storage stability of the obtained blocked polyisocyanate compound (E). The number average molecular weight is more preferably about 1500 or less, and even more preferably about 1200 or less, from the standpoint of water resistance of the formed coating film.

Examples of the active hydrogen-containing compound (e2) having a nonionic hydrophilic group include polyethylene glycol monoalkyl ethers (alternate name: ω-alkoxypolyoxyethylene), such as polyethylene glycol monomethyl ether and polyethylene glycol monoethyl ether; polypropylene glycol monoalkyl ethers (alternate name: ω-alkoxypolyoxypropylene), such as polypropylene glycol monomethyl ether and polypropylene glycol monoethyl ether; ω-alkoxypolyoxyethylene(oxypropylene), such as ω-methoxypolyoxyethylene (oxypropylene) and ω-ethoxypolyoxyethylene (oxypropylene); polyethylene glycol (propylene glycol) monoalkyl ethers, such as polyethylene glycol (propylene glycol)monomethyl ether and polyethylene glycol (propylene glycol)monoethyl ether; and polyethylene glycol, polypropylene glycol, polyethylene glycol (propylene glycol), α-(aminoalkyl)-ω-alkoxypolyoxyethylene, α-(aminoalkyl)-ω-alkoxypolyoxypropylene, α-(aminoalkyl)-ω-alkoxypolyoxyethylene (oxypropylene), and any combinations thereof.

Among these, polyethylene glycol monomethyl ether, polyethylene glycol monoethyl ether, and polyethylene glycol are preferable. Polyethylene glycol monomethyl ether is more preferable.

In the present specification, the term "polyethylene glycol (propylene glycol)" refers to a copolymer of ethylene glycol and propylene glycol, including both block copolymers and random copolymers thereof.

Examples of commercial products of the polyethylene glycol monomethyl ether mentioned above include Uniox M-400, Uniox M-550, Uniox M-1000, and Uniox M-2000, all produced by NOF Corporation. Examples of commercial products of the polyethylene glycol mentioned above include PEG #200, PEG #300, PEG #400, PEG #600, PEG #1000, PEG #1500, PEG #1540, and PEG #2000, all produced by NOF Corporation.

When some isocyanate groups in the polyisocyanate compound (e1) are reacted with the active hydrogen-containing compound (e2), it is preferable to react the polyisocyanate compound (e1) and the active hydrogen-containing compound (e2) so that the number of moles of the active hydrogen in the active hydrogen-containing compound (e2) is about 0.03 to 0.6 mol per mol of the isocyanate groups in the polyisocyanate compound (e1), from the standpoint of storage stability and curability of the obtained blocked polyisocyanate compound (E), and from the standpoint of obtaining a multilayer coating film with excellent metallic luster.

From the standpoint of curability of the obtained blocked polyisocyanate compound (E) and water resistance of the formed coating film, the number of moles of the active hydrogen in the active hydrogen-containing compound (e2) is more preferably about 0.4 or less, and even more preferably about 0.3 or less. From the standpoint of storage stability of the obtained blocked polyisocyanate compound (E), and from the standpoint of obtaining a multilayer coating film with excellent metallic luster, the number of moles of active hydrogen in the active hydrogen-containing compound (e2) is more preferably about 0.04 or more, and even more preferably about 0.05 or more.

Blocking Agent (e3)

Examples of the blocking agent (e3) include phenol-based, alcohol-based, active methylene-based, mercaptan-based, acid amide-based, acid imide-based, imidazole-based, urea-based, oxime-based, carbamic acid-based, amine-based, and imine-based blocking agents, and any combination thereof. Specific examples of the blocking agent (e3) are shown below.

(1) phenol-based blocking agents: phenol, cresol, ethylphenol, butylphenol, and the like
(2) alcohol-based blocking agents: ethylene glycol, benzyl alcohol, methanol, ethanol, and the like
(3) active methylene-based blocking agents: malonic acid diester, acetoacetic ester, isobutyryl acetic ester, and the like
(4) mercaptan-based blocking agents: butyl mercaptan, dodecyl mercaptan, and the like
(5) acid amide-based blocking agents: acetanilide, acetic acid amide, ε-caprolactam, δ-valerolactam, γ-butyrolactam, and the like
(6) acid imide-based blocking agents: succinic acid imide, maleic acid imide, and the like
(7) imidazole-based blocking agents: imidazole, 2-methylimidazole, and the like
(8) urea-based blocking agents: urea, thiourea, ethylene urea, and the like (9) oxime-based blocking agents: formaldoxime, acetaldoxime, methyl ethyl ketoxime, cyclohexanone oxime, and the like
(10) carbamic acid-based blocking agents: phenyl N-phenylcarbamate and the like
(11) amine-based blocking agents: diphenylamine, aniline, carbazole, and the like
(12) imine-based blocking agents: ethylene imine, polyethylene imine, and the like A reaction catalyst can be used, as needed, in the blocking reaction of isocyanate groups with the blocking agent (e3). Examples of the reaction catalyst include basic compounds, such as metal hydroxides, metal alkoxides, metal carboxylates, metal acetylacetonates, hydroxides of onium salts, onium carboxylates, metal salts of active methylene compounds, onium salts of active methylene compounds, aminosilanes, amines, and phosphines.

Preferable onium salts are ammonium salts, phosphonium salts, and sulfonium salts. The reaction catalyst is generally used in an amount of preferably about 10 to about 10,000 ppm, and more preferably about 20 to about 5,000 ppm, based on the total solids content mass of the polyisocyanate compound (e1) and the blocking agent (e3).

Further, isocyanate groups can be blocked with the blocking agent (e3) in the presence of a solvent, as needed, at about 0 to about 150° C. The solvent is preferably a non-protic solvent, and more preferably an ester, an ether, an N-alkylamide, a ketone, or the like. After the reaction has progressed as planned, the reaction may be terminated by adding an acid component to neutralize the basic compound, which is a catalyst.

In the blocking reaction of isocyanate groups with the blocking agent (e3), the amount of the blocking agent (e3) is not particularly limited. However, the blocking agent (e3) is preferably added at a molar ratio of about 0.1 to about 3 mol, and more preferably about 0.2 to about 2 mol, per mol of isocyanate groups in the polyisocyanate compound (e1). Further, the blocking agent that has not reacted with isocyanate groups in the polyisocyanate compound (e1) can be removed after completion of the blocking reaction.

The blocking agent (e3) is preferably an active methylene-based blocking agent, from the standpoint of the low-temperature curability of the coating film to be formed.

From the standpoint of the stability of the aqueous paint composition, the blocked polyisocyanate compound (E) is preferably a blocked polyisocyanate compound (E11) or a blocked polyisocyanate compound (E12) described below.

Nonionic-Hydrophilic-Group-Containing Blocked Polyisocyanate Compound (E11)

The nonionic-hydrophilic-group-containing blocked polyisocyanate compound (E11) (hereinafter also referred to as "the blocked polyisocyanate compound (E11)") has a blocked isocyanate group represented by the following formula (IV):

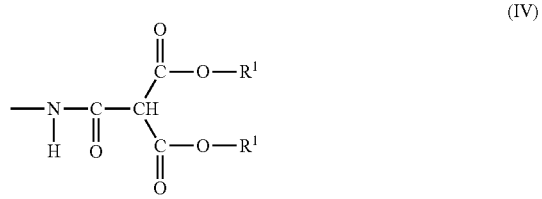

wherein $R^1$'s each independently represent a $C_{1-12}$ hydrocarbon group, and $R^1$'s are the same or different from each other; and a nonionic hydrophilic group.

In the blocked polyisocyanate compound (E11), $R^1$'s are preferably $C_{1-3}$ alkyl groups, because an active methylene-based compound, which can be relatively easily produced, can be used as the blocking agent (e3).

From the standpoint of the compatibility of the resulting blocked polyisocyanate compound (E) with other paint components, $R^1$'s are preferably $C_2$ or $C_3$ alkyl groups. From the standpoint of the storage stability of the resulting blocked polyisocyanate compound (E) and the smoothness and distinctness of image of the coating film to be formed, $R^1$'s are more preferably isopropyl groups.

The blocked polyisocyanate compound (E11) is obtained, for example, by reacting the polyisocyanate compound (e1), the active hydrogen-containing compound (e2), and dialkyl malonate having a $C_{1-12}$ hydrocarbon group as the blocking agent (e3).

Examples of dialkyl malonate include dimethyl malonate, diethyl malonate, di-n-propyl malonate, diisopropyl malonate, di-n-butyl malonate, diisobutyl malonate, di-sec-butyl malonate, di-tert-butyl malonate, di-n-pentyl malonate, di-n-hexyl malonate, di(2-ethylhexyl)malonate, and any combination thereof. Preferable are dimethyl malonate, diethyl malonate, di-n-propyl malonate, diisopropyl malonate, di-n-butyl malonate, diisobutyl malonate, di-sec-butyl malonate, and di-tert-butyl malonate; more preferable are diethyl malonate, di-n-propyl malonate, and diisopropyl malonate; and even more preferable is diisopropyl malonate.

Nonionic-Hydrophilic-Group-Containing Blocked Polyisocyanate Compound (E12)

The nonionic-hydrophilic-group-containing blocked polyisocyanate compound (E12) (hereinafter also referred to as "the blocked polyisocyanate compound (E12)") has a blocked isocyanate group represented by the following formula (V):

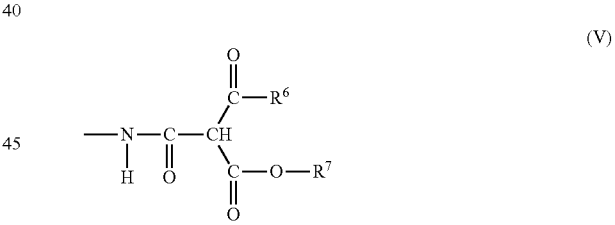

wherein $R^6$ and $R^7$ each independently represent a $C_{1-12}$ hydrocarbon group; and a nonionic hydrophilic group.

In the blocked polyisocyanate compound (E12), $R^6$ and $R^7$ are preferably $C_{1-3}$ alkyl groups, because an active methylene-based compound, which can be relatively easily produced, can be used as the blocking agent (e3).

From the standpoint of improving the compatibility of the resulting blocked polyisocyanate compound (E) with other paint components, $R^6$ and $R^7$ are preferably $C_2$ or $C_3$ alkyl groups. From the standpoint of the storage stability of the resulting blocked polyisocyanate compound (E) and the smoothness and distinctness of image of the coating film to be formed, $R^6$ and $R^7$ are more preferably isopropyl groups.

The blocked polyisocyanate compound (E12) is obtained, for example, by reacting the polyisocyanate compound (e1), the active hydrogen-containing compound (e2), and an acetoacetic ester having a $C_{1-12}$ hydrocarbon group or an isobutyryl acetic ester having a $C_{1-12}$ hydrocarbon group as the blocking agent (e3). The blocking agent (e3) is preferably an isobutyryl acetic ester having a $C_{1-12}$ hydrocarbon group.

Examples of the isobutyryl acetic ester include methyl isobutyryl acetate, ethyl isobutyryl acetate, n-propyl isobutyryl acetate, isopropyl isobutyryl acetate, n-butyl isobutyryl acetate, isobutyl isobutyryl acetate, sec-butyl isobutyryl acetate, tert-butyl isobutyryl acetate, n-pentyl isobutyryl acetate, n-hexyl isobutyryl acetate, 2-ethylhexyl isobutyryl acetate, phenyl isobutyryl acetate, benzyl isobutyryl acetate, and any combination thereof. The isobutyryl acetic ester is preferably methyl isobutyryl acetate, ethyl isobutyryl acetate, or isopropyl isobutyryl acetate.

Examples of the acetoacetic ester include methyl acetoacetate, ethyl acetoacetate, n-propyl acetoacetate, isopropyl acetoacetate, n-butyl acetoacetate, isobutyl acetoacetate, sec-butyl acetoacetate, tert-butyl acetoacetate, n-pentyl acetoacetate, n-hexyl acetoacetate, 2-ethylhexyl acetoacetate, phenyl acetoacetate, benzyl acetoacetate, and any combination thereof. The acetoacetic ester is preferably methyl acetoacetate, ethyl acetoacetate, or isopropyl acetoacetate.

The blocked polyisocyanate compound (E) is preferably a nonionic-hydrophilic-group-containing blocked polyisocyanate compound obtained by further reacting the blocked polyisocyanate compound (E) with a secondary alcohol (e) (hereinafter referred to as "the nonionic-hydrophilic-group-containing blocked polyisocyanate compound (E2)"), from the standpoint of stability in water.

Nonionic-Hydrophilic-Group-Containing Blocked Polyisocyanate Compound (E2)

The nonionic-hydrophilic-group-containing blocked polyisocyanate compound (E2) (hereinafter also referred to as "the blocked polyisocyanate compound (E2)") is obtained, for example, by reacting the blocked polyisocyanate compound (E) with a secondary alcohol (e4) represented by the following formula (VI):

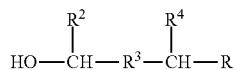

(VI)

wherein $R^2$, $R^4$, and $R^5$ each independently represent a $C_{1-12}$ hydrocarbon group, and $R^3$ represents a $C_{1-12}$ linear or branched alkylene group.

Secondary Alcohol (e4)

The secondary alcohol (e4) is a compound represented by formula (VI). From the standpoint of increasing the reactivity between the blocked polyisocyanate compound (E) and the secondary alcohol (e4), $R^2$ is preferably a methyl group. If the number of carbon atoms in $R^3$, $R^4$, and $R^5$ is large, the polarity of the resulting nonionic-hydrophilic-group-containing blocked polyisocyanate compound (E2) is decreased, which may reduce the compatibility with other paint components. Therefore, $R^3$ is preferably a $C_{1-3}$ alkylene group, and $R^4$ and $R^5$ are preferably methyl groups.

Examples of the secondary alcohol (e4) include 4-methyl-2-pentanol, 5-methyl-2-hexanol, 6-methyl-2-heptanol, 7-methyl-2-octanol, and any combination thereof. Since it is relatively easy to distill and remove part or all of the unreacted secondary alcohol (e4) after the reaction of the nonionic-hydrophilic-group-containing blocked polyisocyanate compound (E) with the secondary alcohol (e4), the secondary alcohol (e4) is preferably 4-methyl-2-pentanol, which has a relatively low boiling point.

From the standpoint of the stability of the aqueous paint composition, the blocked polyisocyanate compound (E2) is preferably a nonionic-hydrophilic-group-containing blocked polyisocyanate compound (E21) or a nonionic-hydrophilic-group-containing blocked polyisocyanate compound (E22) described below.

Nonionic-Hydrophilic-Group-Containing Blocked Polyisocyanate Compound (E21)

The nonionic-hydrophilic-group-containing blocked polyisocyanate compound (E21) (hereinafter also referred to as "the blocked polyisocyanate compound (E21)") is obtained, for example, by reacting a blocked polyisocyanate compound (E11) having a blocked isocyanate group represented by the following formula (IV):

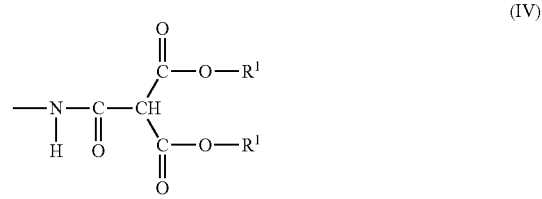

(IV)

wherein $R^1$'s each independently represent a $C_{1-12}$ hydrocarbon group, and $R^1$'s are the same or different from each other; and a nonionic hydrophilic group, with the secondary alcohol (e4).

As a result of the above reaction, one or both of $R^1$'s in the blocked polyisocyanate compound (E11) is replaced with a group represented by the following formula (VII):

(VII)

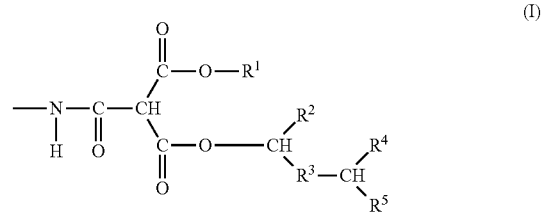

(I)

wherein $R^2$, $R^4$, and $R^5$ each independently represent a $C_{1-12}$ hydrocarbon group, and $R^3$ represents a $C_{1-12}$ linear or branched alkylene group; and/or a blocked isocyanate group represented by the following formula (II):

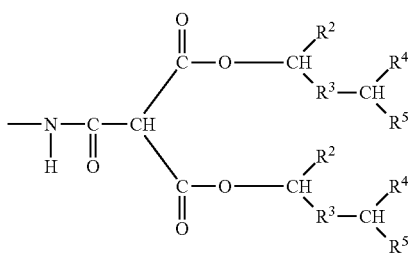

(II)

wherein $R^2$, $R^3$, $R^4$, and $R^5$ are as defined above.

The method of the reaction of the blocked polyisocyanate compound (E11) with the secondary alcohol (e4) is not particularly limited, as long as, for example, at least one of $R^1$'s in the blocked polyisocyanate compound (E11) can be replaced with a group represented by formula (VII). For the above reaction, it is preferable to use a method of obtaining a blocked polyisocyanate compound (E21) having a blocked isocyanate group represented by formula (I) or (II) and a nonionic hydrophilic group by distilling off part or all of the alcohol derived from at least one of $R^1$'s in the blocked polyisocyanate compound (E11) from the system by heating, vacuuming, or the like, and promoting the reaction.

In the above method, it is typical to remove part or all of the alcohol at a temperature of about 20 to about 150° C., and preferably about 75 to about 95° C., over a period of about 5 minutes to about 20 hours, and preferably about 10 minutes to about 10 hours, optionally under reduced pressure. If the above temperature is excessively low, the exchange reaction of the alkoxy group in the blocked polyisocyanate compound (E11) may progress slowly and result in reduced production efficiency. In contrast, if the above temperature is excessively high, the generated blocked polyisocyanate compound (E) may be decomposed, and curability may be reduced.

Nonionic-Hydrophilic-Group-Containing Blocked Polyisocyanate Compound (E22)

The nonionic-hydrophilic-group-containing blocked polyisocyanate compound (E22) (hereinafter also referred to as "the blocked polyisocyanate compound (E22)") is obtained, for example, by reacting a blocked polyisocyanate compound (E12) having a blocked isocyanate group represented by formula (V):

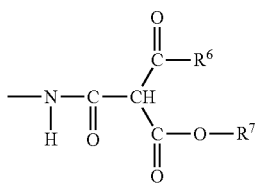

(V)

wherein $R^6$ and $R^7$ each independently represent a $C_{1-12}$ hydrocarbon group; and a nonionic hydrophilic group, with the secondary alcohol (e4).

As a result of the above reaction, $R^7$ in the blocked polyisocyanate compound (E12) is replaced with a group represented by the following formula (VII):

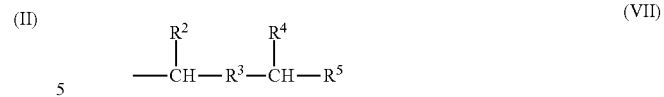

(VII)

wherein $R^2$, $R^4$, and $R^5$ each independently represent a $C_{1-12}$ hydrocarbon group, and $R^3$ represents a $C_{1-12}$ linear or branched alkylene group.

The blocked polyisocyanate compound (E) obtained by the above reaction has a blocked isocyanate group represented by the following formula (III):

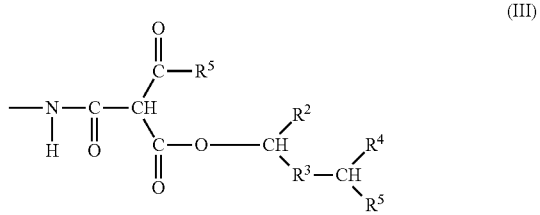

(III)

wherein $R^2$, $R^3$, $R^4$, and $R^5$ are as defined above, and $R^6$ represents a $C_{1-12}$ hydrocarbon group.

The method of the reaction of the blocked polyisocyanate compound (E12) with the secondary alcohol (e4) is not particularly limited, as long as, for example, $R^7$ in the blocked polyisocyanate compound (E12) can be replaced with a group represented by formula (VII). For the reaction, it is preferable to use a method of obtaining a blocked polyisocyanate compound (E22) having a blocked isocyanate group represented by formula (III) and a nonionic hydrophilic group by distilling off part or all of the alcohol derived from $R^7$ in the blocked polyisocyanate compound (E12) from the system by heating, vacuuming, or the like, and promoting the reaction.

In the above method, it is typical to remove part or all of the alcohol at a temperature of about 20 to about 150° C., and preferably about 75 to about 95° C., over a period of about 5 minutes to about 20 hours, and preferably about 10 minutes to about 10 hours, optionally under reduced pressure. If the above temperature is excessively low, the exchange reaction of the alkoxy group in the blocked polyisocyanate compound (E12) may progress slowly and result in reduced production efficiency. In contrast, if the above temperature is excessively high, the generated blocked polyisocyanate compound (E2) may be decomposed, and curability may be reduced.

Regarding the ratio of the blocked polyisocyanate compound (E) and the secondary alcohol (e4) in the production of the blocked polyisocyanate compound (E2), the amount of the secondary alcohol (e4) is preferably within the range of about 5 to about 500 parts by mass, and more preferably about 10 to about 200 parts by mass, based on 100 parts by mass of the solids content of the blocked polyisocyanate compound (E), from the standpoint of the reactivity and production efficiency of the resulting blocked polyisocyanate compound (E).

If the amount of the secondary alcohol (e4) is less than about 5 parts by mass, the reaction of the blocked polyisocyanate compound (E) with the secondary alcohol (e4) may progress too slowly. If the amount of the secondary alcohol (e4) exceeds about 500 parts by mass, the concentration of the resulting blocked polyisocyanate compound (E2) may be too low and result in reduced production efficiency.

In the reaction of the blocked polyisocyanate compound (E1) with the secondary alcohol (e4), in order to adjust the molecular weight of the blocked polyisocyanate compound (E2), the above removal operation may be performed after a polyol compound is added to the blocked polyisocyanate compound (E) and the secondary alcohol (e4).

The blocked polyisocyanate compound (E21) and the blocked polyisocyanate compound (E22) exhibit excellent stability in water. This is assumed to be because they have a nonionic hydrophilic group and are thus relatively stable in water, and also because they have a branched hydrocarbon group, which reduces the polarity of the blocked isocyanate group, resisting hydrolysis.

The blocked polyisocyanate compound (9) preferably has a number average molecular weight of about 600 to about 30000, from the standpoint of compatibility with other paint components, and obtaining a multilayer coating film with excellent metallic luster. The number average molecular weight is more preferably about 10000 or less, and even more preferably about 5000 or less, from the standpoint of compatibility with other paint components, and obtaining a multilayer coating film with excellent metallic luster. From the standpoint of obtaining a multilayer coating film with excellent metallic luster, the number average molecular weight is more preferably about 900 or more, and even more preferably about 1000 or more.

The blocked polyisocyanate compound (E) may be a mixture with a surfactant. The surfactant is preferably a nonionic surfactant, from the standpoint of the stability of the aqueous paint composition.

When the base paint (X) contains the nonionic-hydrophilic-group-containing blocked polyisocyanate compound (E), the content of the blocked polyisocyanate compound (E) may be preferably 2 to 30 parts by mass, more preferably 4 to 20 parts by mass, and even more preferably 7 to 15 parts by mass, based on 100 parts by mass (solids content) of the resin in the base paint (X), from the standpoint of obtaining a multilayer coating film with excellent metallic luster.

The base paint (X) may be transparent or colored, and is preferably colored.

The base paint (X) may contain a pigment, if necessary. When the base paint (X) is transparent, the pigment is contained within a range that does not impair the transparency of the base paint (X).

Examples of the pigment include metallic pigments, rust preventive pigments, color pigments, extender pigments, and the like. Of these, it is preferable to use a color pigment.

Examples of the color pigment include titanium oxide, zinc oxide, carbon black, zinc molybdate, calcium molybdate, Prussian blue, ultramarine blue, cobalt blue, copper phthalocyanine blue, indanthrone blue, chrome yellow, synthetic yellow iron oxide, bismuth vanadate, titanium yellow, zinc chrome (zinc yellow), monoazo yellow, ocher, disazo, isoindolinone yellow, metallic-complex-salt azo yellow, quinophthalone yellow, benzimidazolone yellow, red iron oxide, monoazo red, unsubstituted quinacridone red, azo lake (Mn salts), quinacridone magenta, anthanthrone orange, dianthraquinonyl red, perylene maroon, quinacridone magenta, perylene red, diketopyrrolopyrrole chrome vermilion, chlorinated phthalocyanine green, brominated phthalocyanine green, pyrazolone orange, benzimidazolone orange, dioxazine violet, perylene violet, and the like. These color pigments can be used singly or in a combination of two or more.

The base paint (X) may further suitably contain a base resin other than the polyurethane resin (A) and the polyester resin (D), a crosslinking agent other than the blocked polyisocyanate compound (E), an organic solvent other than the alcohol (B) and the organic solvent (C), a pigment dispersant, an antisettling agent, an ultraviolet absorber, and the like, if necessary, from the standpoint of obtaining a multilayer coating film with excellent metallic luster.

The base resin other than the polyurethane resin (A) and the polyester resin (D) is preferably a resin with excellent weatherability, transparency, and the like. Specific examples include acrylic resins, polyester resins other than the polyester resin (D), epoxy resins, and the like.

Examples of acrylic resins include (meth)acrylic acid esters having a functional group such as a carboxy group, a hydroxy group, an amide group, or a methylol group; other (meth)acrylic acid esters; and resins obtained by copolymerizing styrene or the like.

The polyester resins other than the polyester resin (D) for use may be those obtained by subjecting a polybasic acid, polyhydric alcohol, and optionally modified oil to condensation reaction by an ordinary method.

Examples of epoxy resins include epoxy ester resins obtained by a method in which an epoxy ester is synthesized by a reaction of an epoxy group with an unsaturated fatty acid, and an α,β-unsaturated acid is added to this unsaturated group; or by a method in which the hydroxy group of an epoxy ester and a polybasic acid, such as phthalic acid or trimellitic acid, are esterified.

When the base paint (X) is an aqueous paint, the base resin can be made soluble in water or dispersed in water by using a resin containing a hydrophilic group, such as a carboxy group, a hydroxy group, a methylol group, an amino group, a sulfonic acid group, or a polyoxyethylene bond, most generally a carboxy group, in an amount sufficient for making the resin soluble in water or dispersed in water; and neutralizing the hydrophilic group to form an alkali salt. The amount of hydrophilic groups, for example, carboxy groups, in doing this is not particularly limited, and can be freely determined depending on the solubility or dispersity in water. The amount of hydrophilic groups is typically about 10 mgKOH/g or more, and preferably 15 to 200 mgKOH/g, based on the acid value. Examples of alkaline substances for use in neutralization include sodium hydroxide and amine compounds.

The resin can be dispersed in water by subjecting the monomer component to emulsion polymerization in the presence of a surfactant and a water-soluble resin. The aqueous dispersion of the resin can also be obtained by dispersing the resin in water in the presence of, for example, an emulsifier. In this case of resin dispersion in water, the base resin may be completely free of hydrophilic groups; or may contain hydrophilic groups in an amount smaller than that of the water-soluble resin described above.

Examples of crosslinking agents other than the blocked polyisocyanate compound (E) include amino resins, polyisocyanate compounds, blocked polyisocyanate compounds other than the blocked polyisocyanate compound (E), carbodiimide group-containing compounds, hydrazide group-containing compounds, and semicarbazide group-containing compounds. Of these, amino resins, polyisocyanate compounds, and blocked polyisocyanate compounds other than the blocked polyisocyanate compound (E), which are reactive with hydroxy groups, and carbodiimide group-containing compounds, which are reactive with carboxy groups, are preferable. Usable polyisocyanate compounds and blocked polyisocyanate compounds other than the blocked polyisocyanate compound (E) are those described in the "Clear Paint (Z)" section below. The above crosslinking agents can be used singly or in a combination of two or more.

Specifically, amino resins obtained by condensation or co-condensation of, for example, melamine, benzoguanamine, or urea with formaldehyde; or amino resins obtained by further etherifying such amino resins with a lower monohydric alcohol, are suitably used. Additionally, polyisocyanate compounds or blocked polyisocyanate compounds are also suitably used.

For the base paint (X), an organic solvent other than the alcohol (B) and the organic solvent (C) may optionally be used. Specifically, organic solvents typically used in paint are usable. Examples of organic solvents include hydrocarbons, such as toluene, xylene, hexane, and heptane; esters, such as ethyl acetate, butyl acetate, ethylene glycol monomethyl ether acetate, diethylene glycol monoethyl ether acetate, and diethylene glycol monobutyl acetate; ethers, such as ethylene glycol monomethyl ether, ethylene glycol diethyl ether, diethylene glycol monomethyl ether, and diethylene glycol dibutyl ether; alcohols, such as butanol, propanol, and diethylene glycol; and ketones, such as methyl ethyl ketone, methyl isobutyl ketone, cyclohexanone, and isophorone. These organic solvents may be used singly or in a combination of two or more.

Of the above solvents, organic solvents such as esters, ethers, alcohols, and ketones are preferable, from the standpoint of solubility.

The base paint (X) is applied in the following manner. Deionized water and optionally additives, such as a thickener and an antifoaming agent, are added to the base paint (X) so that the solids content ratio is adjusted to 30 to 62 mass %, preferably 34 to 61 mass %, and more preferably 40 to 60 mass %, and the viscosity is adjusted to 200 to 5000 cps/6 rpm (Brookfield-type viscometer). Then, the adjusted paint is applied to the surface of a substrate by spray coating, rotary atomization coating, or the like. An electrostatic charge may optionally be applied during the coating process.

If the solids content ratio of the base paint (X) is lower than 30 mass %, the coating film appearance may be impaired due to the formation of a mixed layer with an effect pigment dispersion (Y). Even if the solids content ratio of the base paint (X) is higher than 63 mass %, the coating film appearance may be impaired due to the orange peel of the base paint (X).

The cured film thickness of the base coating film obtained by applying the base paint (X) is 6 to 45 μm, preferably 8 to 40 μm, and more preferably 15 to 35 μm. If the cured film thickness of the base coating film is less than 6 μm, the coating film appearance may be impaired due to the orange peel of the base paint (X). Even if the cured film thickness of the base coating film exceeds 45 μm, the coating film appearance may be impaired due to the formation of a mixed layer with an effect pigment dispersion (Y).

Step (2)

Step (2) is to apply an effect pigment dispersion (Y) having a solids content ratio of 0.1 to 10 mass %, preferably 0.5 to 8 mass %, and more preferably 1 to 6 mass %, to the base coating film formed in step (1) to form an effect coating film having a cured film thickness of 0.1 to 5.0 μm, preferably 0.2 to 3.0 μm, and more preferably 0.3 to 2.5 μm.

Effect Pigment Dispersion (Y)

The effect pigment dispersion (Y) contains water, a flake-effect pigment (P), a resin emulsion (Q), and cellulose nanofibers (R).

Flake-Effect Pigment (P)

Examples of the flake-effect pigment (P) include vapor-deposition metal flake pigments, aluminum flake pigments, interference pigments, and the like. One or a combination of two or more of these pigments can be suitably selected for use, depending on the texture desired for the coating film to be obtained. From the standpoint of obtaining a coating film with excellent metallic luster, vapor-deposition metal flake pigments and aluminum flake pigments are preferable. From the standpoint of obtaining a coating film with excellent pearly luster, interference pigments are preferable.

The vapor-deposition metal flake pigment is obtained by vapor-depositing a metal film on a base material, peeling the base material, and then grinding the vapor-deposition metal film. Examples of the base material include films.

The material of the above metal is not particularly limited. Examples include aluminum, gold, silver, copper, brass, titanium, chromium, nickel, nickel chromium, and stainless steel. Of these, aluminum or chromium is particularly preferable, from the standpoints of, for example, availability and convenience in handling. In the present specification, a vapor-deposition metal flake pigment obtained by vapor-depositing aluminum refers to a "vapor-deposition aluminum flake pigment," and a vapor-deposition metal flake pigment obtained by vapor-depositing chromium refers to a "vapor-deposition chromium flake pigment."

The vapor-deposition metal flake pigment for use may be a vapor-deposition metal flake pigment formed from a single layer of a vapor-deposition metal film, or a vapor-deposition metal flake pigment formed from a multilayer composed of a vapor-deposition metal film and additional other metal or metal oxide.

The vapor-deposition aluminum flake pigment is preferably surface-treated with silica, from the standpoint of, for example, obtaining a coating film with excellent storage stability and metallic luster.

Examples of commercial products that can be used as the vapor-deposition aluminum flake pigment include "Metalure" series (trade name, produced by Eckart), "Hydroshine WS" series (trade name, produced by Eckart), "Decomet" series (trade name, produced by Schlenk), and "Metasheen" series (trade name, produced by BASF).

Examples of commercial products that can be used as the vapor-deposition chromium flake pigment include "Metalure Liquid Black" series (trade name, produced by Eckart).

The average thickness of the vapor-deposition metal flake pigment is preferably 0.01 to 1.0 μm, and more preferably 0.015 to 0.1 μm.

The vapor-deposition metal flake pigment has an average particle size (D50) of preferably 1 to 50 μm, and more preferably 5 to 20 μm.

"Average particle size" as used herein refers to the median size in a volume-weighted particle size distribution measured by laser diffraction scattering with a Microtrac MT3300 particle size distribution analyzer (trade name, produced by Nikkiso Co., Ltd.). "Thickness" as used herein is defined as the average value determined by measuring the thickness using image processing software while observing the cross-sectional surface of a coating film that contains the flake-effect pigment with a microscope, and calculating the average value of 100 or more particles.

If the average particle size exceeds the above upper limit value, graininess may occur in the multilayer coating film. If the average particle size is less than the lower limit value, the change in lightness from the highlight to the bottom may become too small.

The aluminum flake pigment is typically produced by crushing and grinding aluminum using a grinding aid in a ball mill or attritor mill, in the presence of a grinding liquid medium. Grinding aide for use in the production step of the aluminum flake pigment include higher fatty acids, such as oleic acid, stearic acid, isostearic acid, lauric acid, palmitic acid, and myristic acid; as well as aliphatic amines, aliphatic amides, and aliphatic alcohols. Grinding liquid media for use include aliphatic hydrocarbons, such as a mineral spirit.

The aluminum flake pigment is broadly categorized into leafing-type aluminum flake pigments and non-leafing-type aluminum flake pigments, according to the type of grinding aid. From the standpoint of forming a dense metallic coating film that exhibits excellent water resistance, high gloss in highlight, and lower graininess, a non-leafing-type flake-aluminum pigment is preferably used in the effect pigment dispersion of the present invention. The non-leafing-type flake-aluminum pigments for use may be those whose surface is not particularly treated; those whose surface is coated with a resin; those whose surface is treated with silica; or those whose surface is treated with phosphoric acid, molybdic acid, or a silane coupling agent. The non-leafing-type flake-aluminum pigment for use may be a non-leafing-type flake-aluminum pigment subjected to one or several of these surface treatments.

The aluminum flake pigment for use may be a colored aluminum pigment prepared by coating the surface of an aluminum flake pigment with a color pigment, and further coating it with a resin; or a colored aluminum pigment prepared by coating the surface of an aluminum flake pigment with a metal oxide such as iron oxide.

From the standpoint of forming a dense metallic coating film that exhibits high gloss in highlight, with lower graininess, the aluminum flake pigment for use preferably has an average particle size of 1 to 100 μm, more preferably 5 to 50 μm, and particularly preferably 6 to 30 μm. The aluminum flake pigment for use preferably has a thickness of 0.01 to 1.0 μm, and particularly preferably 0.02 to 0.5 μm.

As the flake-effect pigment (P) in the effect pigment dispersion (Y), the vapor-deposition metal flake pigment and the aluminum flake pigment may be used in combination.

The interference pigment for use is preferably an interference pigment prepared by coating a transparent or translucent base material with titanium oxide. In the present specification, the transparent base material refers to a base material through which at least 90% of visible light transmits. The translucent base material refers to a base material through which at least 10% to less than 90% of visible light transmits.

Interference pigments are effect pigments obtained by coating the surface of transparent or translucent flaky base materials, such as natural mica, synthetic mica, glass, iron oxide, aluminum oxide, and various metal oxides, with metal oxides with different refractive indices. Examples of the metal oxide include titanium oxide, iron oxide, and the like. Interference pigments can develop various different interference colors depending on the difference in the thickness of the metal oxide.

Specific examples of the interference pigment include the metal oxide-coated mica pigments, metal oxide-coated alumina flake pigments, metal oxide-coated glass flake pigments, and metal oxide-coated silica flake pigments described below.

Metal oxide-coated mica pigments are pigments obtained by coating the surface of a natural mica or synthetic mica base material with a metal oxide. Natural mica is a flaky base material obtained by pulverizing mica from ore. Synthetic mica is synthesized by heating an industrial material, such as $SiO_2$, $MgO$, $Al_2O_3$, $K_2SiF_6$, or $Na_2SiF_6$, to melt the material at a high temperature of about 1500° C.; and cooling the melt for crystallization. When compared with natural mica, synthetic mica contains a smaller amount of impurities, and has a more uniform size and thickness. Specifically, examples of synthetic mica base materials include fluorophlogopite ($KMg_3AlSi_3O_{10}F_2$), potassium tetrasilicon mica ($KMg_{2.5}AlSi_4O_{10}F_2$), sodium tetrasilicon mica ($NaMg_{2.5}AlSi_4O_{10}F_2$), Na taeniolite ($NaMg_2LiSi_4O_{10}F_2$), LiNa taeniolite ($LiMg_2LiSi_4O_{10}F_2$), and the like.

Metal oxide-coated alumina flake pigments are pigments obtained by coating the surface of an alumina flake base material with a metal oxide. Alumina flakes refer to flaky (thin) aluminum oxides, which are clear and colorless. Alumina flakes do not necessarily consist of only aluminum oxide, and may contain other metal oxides.

Metal oxide-coated glass flake pigments are pigments obtained by coating the surface of a flaky glass base material with a metal oxide. The metal oxide-coated glass flake pigments have a smooth base material surface, which causes intense light reflection.

Metal oxide-coated silica flake pigments are pigments obtained by coating flaky silica, a base material having a smooth surface and a uniform thickness, with a metal oxide.

The interference pigment may be surface-treated in order to improve, for example, dispersibility, water resistance, chemical resistance, and weatherability.

From the standpoint of obtaining a coating film with excellent pearly luster, the interference pigment for use preferably has an average particle size of 5 to 30 μm, and particularly preferably 7 to 20 μm.

"Particle size" as used herein refers to the median size in a volume-weighted particle size distribution measured by laser diffraction scattering with a Microtrac MT3300 particle size distribution analyzer (trade name, produced by Nikkiso Co., Ltd.).

From the standpoint of obtaining a coating film with excellent pearly luster, the interference pigment for use preferably has a thickness of 0.05 to 1 μm, and particularly preferably 0.1 to 0.8 μm.

From the standpoint of forming a coating film that exhibits high gloss in highlight, and dense metallic or pearly luster with lower graininess, the flake-effect pigment (P) for use in the effect pigment dispersion (Y) preferably has an average particle size of 1 to 100 μm, more preferably 5 to 50 μm, and particularly preferably 7 to 30 μm. The flake-effect pigment (P) for use preferably has a thickness of 0.01 to 1.0 μm, and particularly preferably 0.02 to 0.5 μm.

From the standpoint of obtaining a coating film with excellent metallic or pearly luster, the content of the flake-effect pigment (P) in the effect pigment dispersion (Y) is, on a solids basis, preferably 2 to 97 mass %, particularly preferably 5 to 65 mass %, and even more preferably 10 to 60 mass %, based on 100 parts by mass of the total solids content in the effect pigment dispersion (Y).

Resin Emulsion (Q)

The resin emulsion (Q) is not particularly limited, as long as a resin is dispersed in an aqueous solvent and it has a coating film-forming ability. Conventionally known resin emulsions can be used without limitation. Specific examples include, but are not limited to, acrylic resin emulsions, acrylic silicon resin emulsions, urethane resin emulsions, acrylic urethane resin emulsions, polyester resin emulsions, alkyd resin emulsions, olefin resin emulsions, fluorine resin emulsions, epoxy resin emulsions, melamine resin emulsions, vinyl acetate emulsions, silicone resin emulsions, vinyl acetate-veova resin emulsions, and the like. The resin emulsion may be modified. These may be used singly or in a combination of two or more. Of these, from the standpoint of obtaining a multilayer coating film with excellent metallic luster, preferable are acrylic resin emulsions, urethane resin emulsions, and acrylic urethane resin emulsions; and particularly preferable are acrylic resin emulsions. Even more preferable are hydroxy-containing acrylic resin emulsions, hydroxy-containing urethane resin emulsions, and hydroxy-containing acrylic urethane resin emulsions.

In particular, the hydroxy-containing acrylic resin emulsion is preferably a core-shell type, from the standpoint of obtaining a multilayer coating film with excellent metallic luster.

The average particle size of the resin emulsion (Q) is 50 to 500 μm, preferably 60 to 300 μm, and more preferably 70 to 200 μm. In the present specification, the average particle size of the resin emulsion is defined as being measured with a "COULTER N4" (produced by Beckman Coulter, Inc.) submicron particle size distribution analyzer at 20° C. as diluted with deionized water.

The content of the resin emulsion (Q) is preferably within the range of 5 to 80 parts by mass, more preferably 15 to 70 parts by mass, and even more preferably 25 to 65 parts by mass, based on 100 parts by mass of the total solids content of components other than the pigment in the effect pigment dispersion MY.

Cellulose Nanofibers (R)

The cellulose nanofibers (R) may also be referred to as cellulose nanofibrils, fibrillated cellulose, or nanocellulose crystals.

The cellulose nanofibers (R) have a number average fiber diameter within the range of preferably 2 to 500 nm, more preferably 2 to 250 nm, and even more preferably 2 to 150 nm, from the standpoint of obtaining a multilayer coating film with excellent metallic luster. The cellulose nanofibers (R) also have a number average fiber length within the range of preferably 0.1 to 20 μm, more preferably 0.1 to 15 μm, and even more preferably 0.1 to 10 μm. The aspect ratio, which is a numerical value obtained by dividing the number average fiber length by the number average fiber diameter, is preferably within the range of 50 to 10000, more preferably 50 to 5000, and even more preferably 50 to 1000.

The number average fiber diameter and number average fiber length are measured and calculated from, for example, an image obtained by subjecting a sample (cellulose nanofibers diluted with water) to a dispersion treatment, casting the sample on a grid coated with a carbon film that has been subjected to hydrophilic treatment, and observing the sample with a transmission electron microscope (TEM)).

The cellulose nanofibers for use may be those obtained by defibrating a cellulose material and stabilizing it in water. The cellulose material as used here refers to cellulose-main materials in various forms. Specific examples include pulp (e.g., grass plant-derived pulp, such as wood pulp, jute, Manila hemp, and kenaf); natural cellulose, such as cellulose produced by microorganisms; regenerated cellulose obtained by dissolving cellulose in a copper ammonia solution, a solvent of a morpholine derivative, or the like, and subjecting the dissolved cellulose to spinning; fine cellulose obtained by subjecting the cellulose material to mechanical treatment, such as hydrolysis, alkali hydrolysis, enzymatic decomposition, blasting treatment, vibration ball milling, and the like, to depolymerize the cellulose; and the like.

The method for defibrating the cellulose material can be any method that enables the cellulose material to remain in a fibrous form. Examples of the method include mechanical defibration treatment using, for example, a homogenizer or a grinder; chemical treatment using, for example, an oxidation catalyst; and biological treatment using, for example, microorganisms.

For the cellulose nanofibers, anionically modified cellulose nanofibers can be used. Examples of anionically modified cellulose nanofibers include carboxylated cellulose nanofibers, carboxymethylated cellulose nanofibers, phosphate group-containing cellulose nanofibers, and the like. The anionically modified cellulose nanofibers can be obtained, for example, by incorporating functional groups such as carboxy groups and carboxymethyl groups into a cellulose material by a known method, washing the obtained modified cellulose to prepare a dispersion of the modified cellulose, and defibrating this dispersion. The carboxylated cellulose is also referred to as oxidized cellulose.

The oxidized cellulose is obtained, for example, by oxidizing the cellulose material in water using an oxidizing agent in the presence of a compound selected from the group consisting of N-oxyl compounds, bromides, iodides, and mixtures thereof.

The amount of an N-oxyl compound can be any amount, as long as the amount is a catalytic amount that can disintegrate cellulose into nanofibers. The amount of a bromide or iodide can be suitably selected within the range in which an oxidation reaction is promoted.

The oxidizing agent for use may be a known oxidizing agent. Examples include halogen, hypohalous acid, halous acid, perhalogenic acid, salts thereof, halogen oxide, and peroxide. It is preferable to set the conditions so that the amount of carboxy groups in oxidized cellulose is 0.2 mmol/g or more based on the solids content mass of the oxidized cellulose. The amount of carboxy groups can be adjusted, for example, by performing the following: adjustment of oxidation reaction time; adjustment of oxidation reaction temperature; adjustment of pH in oxidation reaction; and adjustment of the amount of an N-oxyl compound, a bromide, an iodide, an oxidizing agent, or the like.

The carboxymethylated cellulose can be obtained, for example, in the following manner. A cellulose material and a solvent are mixed, and mercerization treatment is performed using 0.5 to 20-fold moles of alkali hydroxide metal per glucose residue of the cellulose material as a mercerization agent at a reaction temperature of 0 to 70° C. for a reaction time of about 15 minutes to 8 hours. Thereafter, 0.05 to 10-fold moles of a carboxymethylating agent per glucose residue is added thereto, followed by reaction at a reaction temperature of 30 to 90° C. for about 30 minutes to 10 hours.

The degree of substitution of carboxymethyl per glucose unit in the modified cellulose obtained by introducing carboxymethyl groups into the cellulose material is preferably 0.02 to 0.5.

The thus-obtained anionically modified cellulose can be dispersed in an aqueous solvent to form a dispersion, and the dispersion can be further defibrated. The method of defibration is not particularly limited. However, when mechanical treatment is used, the device for use may be any of the following: a high-speed shearing grinder, a collider grinder, a bead mill grinder, a high-speed rotating grinder, a colloid mill grinder, a high-pressure grinder, a roll mill grinder, and an ultrasonic grinder. These can be used in a combination of two or more.

Examples of commercial products of the cellulose nanofibers (R) include Rheocrysta (registered trademark) produced by DKS Co. Ltd., and the like.

The content of the cellulose nanofibers (R) in the effect pigment dispersion (Y) is, on a solids basis, preferably within the range of 5 to 70 parts by mass, more preferably 7 to 50 parts by mass, and even more preferably 10 to 40 parts by mass, based on 100 parts by mass of the total solids content of components other than the pigment in the effect pigment dispersion (Y), from the standpoint of obtaining a multilayer coating film with excellent metallic luster.

Wetting Agent (S)

The effect pigment dispersion (Y) preferably further contains a wetting agent (S), from the standpoint of obtaining a multilayer coating film with excellent metallic luster.

The wetting agent (S) can be any wetting agent that aids in uniformly orientating the effect pigment dispersion on a substrate, when the effect pigment dispersion (Y) is applied to the substrate.

Materials that have such an effect are also referred to as "dispersant," "wetter," "leveling agent," "surface-adjusting agent," "antifoaming agent," "surfactant," "super wetter," or the like, as well as wetting agent. The wetting agent (S) in the effect pigment dispersion of the present invention includes a dispersant, a wetter, a leveling agent, a surface-adjusting agent, an antifoaming agent, a surfactant, and a super wetter.

From the standpoint of obtaining a multilayer coating film with excellent metallic luster, the amount of the wetting agent (S) in the effect pigment dispersion (Y) is, on a solids basis, preferably 4 to 70 parts by mass, more preferably 5 to 60 parts by mass, and even more preferably 8 to 50 parts by mass, based on 100 parts by mass of the total solids content of components other than the pigment in the effect pigment dispersion (Y).

Examples of the wetting agent (S) include silicone-based, acrylic-based, vinyl-based, fluorine-based, and acetylene diol-based wetting agents. These wetting agents can be used singly or in a combination of two or more.

As the wetting agent (S), it is preferable to use an acetylene diol-based wetting agent and/or a wetting agent having an ethylene oxide chain, from the standpoint of obtaining a multilayer coating film with excellent metallic luster.

In particular, as the wetting agent (S), it is preferable to use a wetting agent that is an ethylene oxide adduct of acetylene diol.

Examples of commercial products of the wetting agent (S) include BYK series (produced by BYK-Chemie), Tego series (produced by Evonik), Glanol series and Polyflow series (produced by Kyoeisha Chemical Co., Ltd.), DISPARLON series (produced by Kusumoto Chemicals, Ltd.), Surfynol series (produced by Evonik Industries), and the like.

Usable silicone-based wetting agents include polydimethylsiloxane and modified silicone obtained by modifying polydimethylsiloxane. Examples of modified silicone include polyether-modified silicone, acrylic-modified silicone, polyester-modified silicone, and the like.

The effect pigment dispersion (Y) may further suitably contain resins other than the resin emulsion (Q), if necessary, from the standpoint of obtaining a multilayer coating film with excellent metallic luster. Resins other than the resin emulsion (Q) may be non-water-dispersible resins, for example, water-soluble resins. Specific examples include acrylic resins, polyester resins, alkyd resins, urethane resins, and the like.

The effect pigment dispersion (Y) may further contain a rheology control agent other than the cellulose nanofibers (R), from the standpoint of obtaining a multilayer coating film with excellent metallic luster. As the rheology control agent other than the cellulose nanofibers (R), a known rheology control agent can be used. Examples include silica-based fine powder, mineral-based rheology control agents, barium sulfate atomization powder, polyamide-based rheology control agents, organic resin fine particle rheology control agents, diurea-based rheology control agents, urethane association-type rheology control agents, polyacrylic acid-based rheology control agents, which are acrylic swelling-type, cellulose-based rheology control agents other than the cellulose nanofibers (R), and the like. Of these, particularly from the standpoint of obtaining a coating film with excellent metallic luster, it is preferable to use a mineral-based rheology control agent or a polyacrylic acid-based rheology control agent.

Examples of mineral-based rheology control agents include swelling laminar silicate that has a 2:1 type crystal structure. Specific examples include smectite group clay minerals, such as natural or synthetic montmorillonite, saponite, hectorite, stevensite, beidellite, nontronite, bentonite, and laponite; swelling mica group clay minerals, such as Na-type tetrasilicic fluorine mica, Li-type tetrasilicic fluorine mica, Na salt-type fluorine taeniolite, and Li-type fluorine taeniolite; vermiculite; substitution products or derivatives thereof; and mixtures thereof.

Examples of polyacrylic acid-based rheology control agents include sodium polyacrylate, polyacrylic acid-(meth)acrylic acid ester copolymers, and the like.

The active ingredient acid value of the polyacrylic acid-based rheology control agent can be within the range of 30 to 300 mgKOH/g, and preferably 80 to 280 mgKOH/g. Examples of commercial products of the polyacrylic acid-based rheology control agent include "Primal ASE-60," "Primal TT615," and "Primal RMS" (trade names, produced by The Dow Chemical Company); "SN Thickener 613," "SN Thickener 618," "SN Thickener 630," "SN Thickener 634," and "SN Thickener 636" (trade names, produced by San Nopco Limited); and the like.

In the effect pigment dispersion (Y), a coating film obtained by using the cellulose nanofibers (R) and an acrylic acid-based rheology control agent in combination is preferable, in terms of excellent water resistance. In this case, the mixing ratio of cellulose nanofibers (R) and acrylic acid-based rheology control agent is preferably 10/90 to 90/10, more preferably 20/80 to 80/20, and even more preferably 40/60 to 60/40.

Examples of cellulose-based rheology control agents other than the cellulose nanofibers (R) include carboxymethylcellulose, methylcellulose, hydroxyethylcellulose, hydroxyethylmethylcellulose, hydroxypropylmethylcellulose, and the like.

These rheology control agents can be used singly or in a combination of two or more.

The effect pigment dispersion (Y) may further suitably contain a crosslinking agent, an organic solvent, a color pigment, an extender pigment, a pigment dispersant, an antisettling agent, an ultraviolet absorber, and the like, if necessary, from the standpoint of obtaining a multilayer coating film with excellent metallic luster.

Examples of the crosslinking agent include melamine resins, melamine resin derivatives, urea resins, (meth)acrylamide, polyaziridine, polycarbodiimide, blocked or unblocked polyisocyanate compounds, and the like. These may be used singly or in a combination of two or more.

Of these, blocked polyisocyanate compounds are particularly preferable, from the standpoint of the water resistance and adhesion of the coating film to be obtained.

The blocked polyisocyanate compound is obtained by adding a blocking agent to the isocyanate groups of a polyisocyanate compound. The blocked polyisocyanate compound formed by the addition is stable at room temperature. However, when heated to a baking temperature for the coating film (typically, about 80 to about 200° C.), the blocking agent preferably dissociates to thereby regenerate free isocyanate groups. Examples of blocking agents that satisfy such requirements include phenol-based, lactam-based, alcohol-based, ether-based, oxime-based, active methylene-based, mercaptan-based, acid amide-based, imide-based, amine-based, imidazole-based, and pyrazole-based blocking agents. Of these, the crosslinking agent for use is preferably a pyrazole-based blocked polyisocyanate compound, from the standpoint of the water resistance, adhesion, and the like of the coating film to be obtained.

Examples of the color pigment include titanium oxide, zinc oxide, carbon black, zinc molybdate, calcium molybdate, Prussian blue, ultramarine blue, cobalt blue, copper phthalocyanine blue, indanthrone blue, chrome yellow, synthetic yellow iron oxide, bismuth vanadate, titanium yellow, zinc chrome (zinc yellow), monoazo yellow, ocher, disazo, isoindolinone yellow, metallic-complex-salt azo yellow, quinophthalone yellow, benzimidazolone yellow, red iron oxide, monoazo red, unsubstituted quinacridone red, azo lake (Mn salts), quinacridone magenta, anthanthrone orange, dianthraquinonyl red, perylene maroon, quinacridone magenta, perylene red, diketopyrrolopyrrole chrome vermilion, chlorinated phthalocyanine green, brominated phthalocyanine green; and others, such as pyrazolone orange, benzimidazolone orange, dioxazine violet, perylene violet, and the like.

Examples of the extender pigment include clay, kaolin, barium sulfate, barium carbonate, calcium carbonate, talc, silica, alumina white, and the like.

Coating of Effect Pigment Dispersion (Y)

The effect pigment dispersion (Y) is prepared by mixing and dispersing the components described above. The solids content ratio of the effect pigment dispersion (Y) during coating is adjusted to 0.1 to 10 mass %, preferably 0.5 to 8 mass %, and more preferably 1 to 6 mass %, based on the effect pigment dispersion (Y), from the standpoint of obtaining a multilayer coating film with excellent metallic luster. If the solids content ratio of the effect pigment dispersion (Y) during coating is lower than 0.1 mass %, coating with a uniform film thickness is difficult. If the solids content ratio of the effect pigment dispersion (Y) during coating is higher than 10 mass %, the metallic luster of the formed coating film is inferior.

The viscosity of the effect pigment dispersion (Y) at a temperature of 20° C. measured by a Brookfield-type viscometer at 60 rpm after 1 minute (also referred to as "the B60 value" in the present specification) is preferably 60 to 1500 mPa·s, more preferably 60 to 1000 mPa·s, and even more preferably 60 to 500 mPa·s, from the standpoint of obtaining a multilayer coating film with excellent metallic luster. The viscometer used in this case is LVDV-I (trade name, a Brookfield-type viscometer, produced by Brookfield).

The effect pigment dispersion (Y) can be applied by a method such as electrostatic coating, air spray coating, or airless spray coating. Rotary atomization electrostatic coating is particularly preferable in the method for forming a multilayer coating film of the present invention.

The effect coating film obtained by applying the effect pigment dispersion (Y) is preferably dried.

The method for drying the effect coating film is not particularly limited. For example, the effect coating film is allowed to stand at room temperature for 15 to 30 minutes, or preheated at a temperature of 50 to 100° C. for 30 seconds to 10 minutes.

The cured film thickness of the effect coating film obtained by applying the effect pigment dispersion (Y) is 0.1 to 5.0 µm, preferably 0.2 to 3.0 µm, and more preferably 0.3 to 2.5 µm. If the cured film thickness of the effect coating film is less than 0.1 µm, the multilayer coating film to be obtained has low specular gloss. If the cured film thickness of the effect coating film exceeds 5.0 µm, the multilayer coating film to be obtained has low specular gloss, and the coating film appearance is impaired.

Step (3)

Step (3) is to apply a two-component clear paint (Z) containing a hydroxy-containing resin and a polyisocyanate compound to the effect coating film formed in step (2) to form a clear coating film.

Hydroxy-Containing Resin

As the hydroxy-containing resin, conventionally known resins can be used without limitation, as long as they are resins containing a hydroxy group. Examples of the hydroxy-containing resin include hydroxy-containing acrylic resins, hydroxy-containing polyester resins, hydroxy-containing polyether resins, hydroxy-containing polyurethane resins, and the like; preferably hydroxy-containing acrylic resins and hydroxy-containing polyester resins; and particularly preferably hydroxy-containing acrylic resins.

The hydroxy value of the hydroxy-containing acrylic resin is preferably within the range of 80 to 200 mgKOH/g, and more preferably 100 to 180 mgKOH/g. If the hydroxy value is less than 80 mgKOH/g, the crosslinking density is low, and thus the scratch resistance may be insufficient. If the hydroxy value exceeds 200 mgKOH/g, the water resistance of the coating film may be reduced.

The weight average molecular weight of the hydroxy-containing acrylic resin is preferably within the range of 2500 to 40000, and more preferably 5000 to 30000. If the weight average molecular weight is less than 2500, the coating film performance, such as acid resistance, may be reduced. If the weight average molecular weight exceeds 40000, the smoothness of the coating film is reduced, and thus the finish may be reduced.

In the present specification, the average molecular weight refers to a value calculated from a chromatogram measured by gel permeation chromatography based on the molecular weight of standard polystyrene. For the gel permeation chromatography, "HLC8120GPC" (produced by Tosoh Corporation) was used. The measurement was conducted using four columns: "TSKgel G-4000HXL," "TSKgel G-3000HXL," "TSKgel G-2500HXL," and "TSKgel G-2000HXL" (trade names, all produced by Tosoh Corporation) under the conditions of mobile phase: tetrahydrofuran, measuring temperature: 40° C., flow rate: 1 cc/min, and detector: RI.

The glass transition temperature of the hydroxy-containing acrylic resin is −40° C. to 20° C., and particularly preferably −30° C. to 10° C. If the glass transition temperature is less than −40° C., the coating film hardness may be insufficient. If the glass transition temperature exceeds 20° C., the coating surface smoothness of the coating film may be reduced.

Polyisocyanate Compound

The polyisocyanate compound is a compound having at least two isocyanate groups per molecule. Examples include aliphatic polyisocyanates, alicyclic polyisocyanates, aromatic-aliphatic polyisocyanates, aromatic polyisocyanates, derivatives of these polyisocyanates, and the like.

Examples of the aliphatic polyisocyanates for use include the aliphatic polyisocyanates mentioned in the description of the polyurethane resin (A).

Examples of the alicyclic polyisocyanates for use include the alicyclic polyisocyanates mentioned in the description of the polyurethane resin (A).

Examples of the aromatic-aliphatic polyisocyanates for use may be the aromatic-aliphatic polyisocyanate mentioned in the description of the polyurethane resin (A).

Examples of the aromatic polyisocyanates for use include the aromatic polyisocyanates mentioned in the description of the polyurethane resin (A).

Examples of the derivatives of the polyisocyanates for use include the derivatives of the polyisocyanates mentioned in the description of the polyurethane resin (A).

These polyisocyanates and derivatives thereof may be used singly or in a combination of two or more.

Of the aliphatic polyisocyanates, hexamethylene diisocyanate and derivatives thereof are preferably used; and of the alicyclic polyisocyanates, 4,4'-methylenebis(cyclohexyl isocyanate) and derivatives thereof are preferably used. Of these, in particular, derivatives of hexamethylene diisocyanate are most preferable, from the standpoint of, for example, adhesion and compatibility.

The polyisocyanate compound for use may also be a prepolymer that is formed by reacting the polyisocyanate or a derivative thereof with a compound having an active hydrogen group (e.g., a hydroxy or amino group), reactive with the polyisocyanate, in the presence of an excessive amount of isocyanate groups. Examples of compounds reactive with the polyisocyanate include polyhydric alcohols, low-molecular-weight polyester resins, amines, and water.

The polyisocyanate compound for use may be a blocked polyisocyanate compound in which some or all of the isocyanate groups of the polyisocyanate or a derivative thereof are blocked with a blocking agent.

Examples of the blocking agent for use include the blocking agents mentioned in the description of the polyurethane resin (A).

Blocking (reacting with a blocking agent) can be performed by optionally adding a solvent. The solvent for use in blocking reaction is preferably not reactive with isocyanate groups. Examples of solvents include ketones, such as acetone and methyl ethyl ketone; esters, such as ethyl acetate; and N-methyl-2-pyrrolidone (NMP).

The polyisocyanate compounds can be used singly or in a combination of two or more.

The polyisocyanate compounds can be used singly or in a combination or two or more. In the two-component clear coat paint of the present invention, the equivalent ratio of the isocyanate groups in the polyisocyanate compound to the hydroxy groups in the hydroxy-containing resin (NCO/OH) is preferably 0.5 to 2.0, and more preferably 0.8 to 1.5, from the standpoint of, for example, the curability and scratch resistance of the coating film.

The clear paint (Z) may suitably contain additives, such as solvents (e.g., water and organic solvents), curing catalysts, antifoaming agents, and ultraviolet absorbers, if necessary.

The clear paint (Z) may suitably contain a color pigment within the range that does not impair transparency. As the color pigment, pigments that are conventionally known for ink or paint can be used singly or in a combination of two or more. The amount thereof to be added may be suitably determined, but is 30 parts by weight or less, and preferably 0.01 to 10 parts by weight or less, based on 100 parts by mass of the vehicle-forming resin composition in the clear paint (Z).

The form of the clear paint (Z) is not particularly limited. The clear paint (Z) is generally used as an organic solvent-based paint composition. Examples of the organic solvent used in this case include various organic solvents for paints, such as aromatic or aliphatic hydrocarbon solvents, ester solvents, ketone solvents, and ether solvents. As the organic solvent, the solvent used in the preparation of the hydroxy-containing resin can be used as is; or one or more other organic solvents may be added appropriately, and the resulting mixed solvent can be used.

The clear paint (Z) can be prepared by mixing a hydroxy-containing resin and a polyisocyanate compound, and optionally a curing catalyst, a pigment, various resins, an ultraviolet absorber, a light stabilizer, an organic solvent, and the like by a known method.

In terms of storage stability, the clear paint (Z) is a two-component paint in which a hydroxy-containing resin and a polyisocyanate compound are separated, and is prepared by mixing them just before use.

The solids concentration of the clear paint (Z) is preferably about 30 to 70 mass %, and more preferably about 40 to 60 mass %.

The clear paint (Z) is applied to the effect coating film. The coating of the clear paint (Z) is not particularly limited, and can be performed in the same manner as for the base coat paint. For example, the clear paint (Z) can be applied by a coating method, such as air spray coating, airless spray coating, rotary atomization coating, or curtain coating. In these coating methods, an electrostatic charge may be applied, if necessary. Among these, rotary atomization coating using an electrostatic charge is preferable. In general, the coating amount of the clear paint (Z) is preferably an amount that achieves a cured film thickness of about 10 to 50 μm.

When the clear paint (Z) is applied, it is preferable to appropriately adjust the viscosity of the clear paint (Z) within a viscosity range suitable for the coating method. For example, for rotary atomization coating using an electrostatic charge, it is preferable to appropriately adjust the viscosity of the clear paint (Z) within a range of about 15 to 60 seconds as measured by a Ford cup No. 4 viscometer at 20° C. using a solvent, such as an organic solvent.

After the clear paint (Z) is applied to form a clear coating film, preheating may be performed, for example, at a temperature of about 50 to 80° C. for about 3 to 10 minutes in order to promote the volatilization of volatile components.

Step (4)

Step (4) is to heat the uncured base coating film, the uncured effect coating film, and the uncured clear coating film formed in steps (1) to (3) to simultaneously cure these three coating films. Even when the effect pigment dispersion (Y) does not contain the crosslinking agent mentioned above, the effect coating film may be cured due to the transfer of the resin component from the upper layer and/or lower layer.

Heating can be performed by a known means. For example, a drying furnace, such as a hot-blast stove, an electric furnace, or an infrared beam heating furnace, can be used.

The heating temperature is preferably within the range of 70 to 150° C., and more preferably 80 to 140° C.

The heating time is not particularly limited. However, it is preferably within the range of 10 to 40 minutes, and more preferably 20 to 30 minutes.

Steps (1) to (4) are sequentially performed to form a multilayer coating film.

In the present invention, a step of preheating the coating film, a step of setting the coating film (left for a predetermined period of time to evaporate the solvent), a step of sanding (polishing) the coating film, and the like may be suitably performed between the steps.

The following defines preferable ranges of the 60-degree specular gloss and HG value of the multilayer coating film obtained in the present invention. However, this does not mean that the 60-degree specular gloss and HG value are always within the above ranges when the cured film thickness of the base coating film is 6 to 45 µm and the cured film thickness of the effect coating film is 0.1 to 5.0 µm; rather, this means that the 60-degree specular gloss and HG value are within the above ranges when each coating film is a value within the above range.

The multilayer coating film obtained in the present invention preferably has a 60-degree specular gloss of 90 or more.

The 60-degree specular gloss of the multilayer coating film obtained in the present invention being equal to or higher than the above numerical value means that it has excellent metallic gloss.

The 60-degree specular gloss (60-degree gloss) of the multilayer coating film obtained in the present invention is preferably within the range of 90 or more, more preferably 94 to 140, and even more preferably 97 to 130.

The specular gloss refers to a ratio of specular reflection from the surface of an object to specular reflection light from a reference surface (glass with a refractive index of 1.567), and is a value defined by JIS-Z8741. Specifically, specular gloss is determined in the following manner: a luminous flux of a predetermined aperture angle is allowed to enter the surface of a measurement sample at a predetermined incident angle, and a luminous flux of a predetermined aperture angle reflected in the direction of specular reflection is measured with an optical receiver; i.e., specular gloss is a value measured with a "glossmeter." In the present specification, the specular gloss is defined as a 60-degree specular gloss (60-degree gloss) measured with a glossmeter (micro-TRI-gloss, produced by BYK-Gardner).

The graininess is indicated by a hi-light graininess value (abbreviated as "HG value" below). The HG value is a measure of micro-brilliance determined by microscopic observation, and indicates a parameter of the graininess in the highlight (observation of the coating film from near the specular reflection light with respect to incident light). The HG value is calculated as follows. First, the coating film is photographed with a CCD camera at a light incidence angle of 15° and a receiving angle of 0°, and the obtained digital image data (i.e., two-dimensional brilliance distribution data) is subjected to a two-dimensional Fourier transform to obtain a power spectrum image. Subsequently, only the spatial frequency domain that corresponds to graininess is extracted from the power spectrum image, and the obtained measurement parameter is converted to an HG value from 0 to 100 so as to have a linear relation with graininess. Specifically, the HG value can be measured with a micro brilliance-measuring device.

HG is determined by the following formula:
In the case of IPSL≥0.32, HG=500·IPSL-142.5
In the case of 0.32>IPSL≥0.15, HG=102.9·IPSL-15.4
In the case of 0.15>IPSL, HG=0
IPSL (Integration of Power Spectrum of Low Frequency) is determined by the following formula:

$$IPSL = \int_0^N \int_0^{Tx} P(v,\theta) dv d\theta / P(0,0)$$

$P(v, \theta)$ represents a power spectrum obtained by performing two-dimensional Fourier transform on the two-dimensional luminance distribution data generated from acquired image data. $v$ represents a spatial frequency. $\theta$ represents an angle. 0 to N represent a spatial frequency domain that correspond to graininess.

The details of the measurement method are found in Research on Coatings (Kansai Paint Technical Report), No. 138, August 2002, pp. 8 to 24; and in Research on Coatings (Kansai Paint Technical Report), No. 132, April 1999, pp. 22 to 35. A lower HG value of graininess indicates less graininess on the surface of the coating film.

In an embodiment, the HG value of a multilayer coating film obtained using an effect pigment dispersion (Y) containing a vapor-deposition metal flake pigment and/or an aluminum flake pigment as the flake-effect pigment (P) is preferably within the range of 10 to 45, more preferably 10 to 42, and even more preferably 10 to 40, from the standpoint of the denseness of the metallic coating film.

In another embodiment, the HG value of a multilayer coating film obtained using an effect pigment dispersion (Y) containing an interference pigment as the flake-effect pigment (P) is preferably within the range of 10 to 65, more preferably 10 to 63, and even more preferably 10 to 60, from the standpoint of the denseness of the metallic coating film.

The present invention can also encompass the following embodiments.

Item 1. A method for forming a multilayer coating film, comprising the following steps (1) to (4):
- (1) applying a base paint (X) having a solids content ratio of 30 to 62 mass % to a substrate to form a base coating film having a cured film thickness of 6 to 45 µm;
- (2) applying an effect pigment dispersion (Y) having a solids content ratio of 0.1 to 10 mass % to the base coating film formed in step (1) to form an effect coating film having a cured film thickness of 0.1 to 5.0 µm;
- (3) applying a two-component clear paint (Z) containing a hydroxy-containing resin and a polyisocyanate compound to the effect coating film formed in step (2) to form a clear coating film; and
- (4) heating the uncured base coating film, the uncured effect coating film, and the uncured clear coating film formed in steps (1) to (3) to simultaneously cure these coating films; wherein
- the base paint (X) contains a polyurethane resin (A), an alcohol (B) containing 6 to 12 carbon atoms, and an organic solvent (C) having an HLB of 7 to 9, and
- the effect pigment dispersion (Y) contains water, a flake-effect pigment (P), a resin emulsion (Q), and cellulose nanofibers (R).

Item 2. The method for forming a multilayer coating film according to Item 1, wherein the mass ratio of the content of the alcohol (B) to the content of the organic solvent (C) of (B)/(C) is 0.7 to 3.0.

Item 3. The method for forming a multilayer coating film according to Item 1 or 2, wherein the alcohol (B) is a linear or branched aliphatic alcohol.

Item 4. The method for forming a multilayer coating film according to any one of Items 1 to 3, wherein the alcohol (B) is contained in an amount of preferably 5 to 45 parts by mass, more preferably 10 to 40 parts by mass, and still more preferably 15 to 30 parts by mass, based on 100 parts by mass (solids content) of the resin contained in the base paint (X).

Item 5. The method for forming a multilayer coating film according to any one of Items 1 to 4, wherein the organic solvent (C) is at least one member selected from the group consisting of propylene glycol monomethyl ether, ethylene glycol monobutyl ether, dipropylene glycol monomethyl ether, diethylene glycol monobutyl ether, and tripropylene glycol monomethyl ether.

Item 6. The method for forming a multilayer coating film according to any one of Items 1 to 5, wherein the organic solvent (C) is contained in an amount of preferably 3 to 22 parts by mass, more preferably 5 to 20 parts by mass, and still more preferably 8 to 18 parts by mass, based on 100 parts by mass (solids content) of the resin contained in the base paint (X).

Item 7. The method for forming a multilayer coating film according to any one of Items 1 to 6, wherein the base paint (X) further contains a polyester resin (D) having a number average molecular weight of 1500 to 10000.

Item 8. The method for forming a multilayer coating film according to any one of Items 1 to 7, wherein the base paint (X) further contains a nonionic-hydrophilic-group-containing blocked polyisocyanate compound (E).

Item 9. The method for forming a multilayer coating film according to Item 8, wherein the nonionic-hydrophilic-group-containing blocked polyisocyanate compound (E) contains a blocked polyisocyanate compound (E11) or a blocked polyisocyanate compound (E12).

Item 10. The method for forming a multilayer coating film according to Item 8, wherein the nonionic-hydrophilic-group-containing blocked polyisocyanate compound (E) contains a blocked polyisocyanate compound (E21) or a blocked polyisocyanate compound (E22).

Item 11. The method for forming a multilayer coating film according to any one of Items 8 to 10, wherein the nonionic-hydrophilic-group-containing blocked polyisocyanate compound (E) is contained in an amount of preferably 2 to 30 parts by mass, more preferably 4 to 20 parts by mass, and still more preferably 7 to 15 parts by mass, based on 100 parts by mass (solids content) of the resin contained in the base paint (X).

Item 12. The method for forming a multilayer coating film according to any one of Items 1 to 11, wherein the flake-effect pigment (P) contains one or two members selected from the group consisting of a vapor-deposition metal flake pigment, an aluminum flake pigment, and an interference pigment.

Item 13. The method for forming a multilayer coating film according to any one of Items 1 to 12, wherein the resin emulsion (Q) contains an acrylic resin emulsion, a urethane resin emulsion, or an acrylic urethane resin emulsion.

Item 14. The method for forming a multilayer coating film according to any one of Items 1 to 13, wherein the effect pigment dispersion (Y) further contains a wetting agent (S).

Item 15. The method for forming a multilayer coating film according to Item 14, wherein the wetting agent (S) is an acetylene diol-based wetting agent.

Item 16. The method for forming a multilayer coating film according to Item 15, wherein the acetylene diol-based wetting agent is an ethylene oxide adduct of acetylene diol.

EXAMPLES

The present invention is described in more detail below with reference to Examples and Comparative Examples. However, the present invention is not limited only to these Examples. "Part(s)" and "%" are both based on mass.

Production of Polyurethane Resin (A)

Production Example 1

30.1 parts of hydrogenated MDI and 1.5 parts of methyl ethyl ketoxime were placed in a reaction vessel equipped with a thermometer, a thermostat, a stirrer, a reflux condenser, and a water separator, and the mixture was heated to 80° C. and stirred for 1 hour, thereby obtaining an isocyanate reactant. In a different vessel, 64.1 parts of "UM90 (1/1)" (trade name, polycarbonate diol comprising, as diol components, 1,4-cyclohexanedimethanol and 1,6-hexanediol, and having a mass ratio of 1,4-cyclohexanedimethanol/1,6-hexanediol=1/1, produced by Ube Industries, Ltd.) and 4.2 parts of dimethylolpropionic acid were placed, and the content was heated to 80° C. while stirring. After the temperature reached 80° C., the isocyanate reactant was added dropwise over a period of 1 hour. Thereafter, 29.9 parts of N-methylpyrrolidone was added, followed by aging at 80° C., and urethanization reaction was performed. Heating was stopped when the isocyanate value reached 3.0 or less, and 2.75 parts of triethylamine was added at 70° C. Subsequently, while the temperature was kept at 50° C., 200 parts of deionized water was added dropwise over a period of 1 hour to perform water dispersion, thereby obtaining a urethane resin emulsion (A-1). The obtained urethane resin emulsion (A-1) had a solids content of 30%, an acid value of 19.9 mgKOH/g, a weight average molecular weight of 11300, and a particle size of 77 nm as measured by dynamic light scattering.

Production Example 2

30 parts of diethylene glycol monoethyl ether acetate was placed in a reaction vessel equipped with a thermometer, a thermostat, a stirrer, and a reflux condenser and heated to 145° C. under a nitrogen gas stream. Thereafter, the nitrogen gas stream was stopped, and as a first stage (for hydrophobic chain component), a mixture of 23.8 parts of n-butyl acrylate, 14 parts of n-butyl methacrylate, 7 parts of styrene, 24.5 parts of 2-hydroxyethyl methacrylate, 0.7 parts of glycidyl methacrylate, and 3.0 parts of di-t-butylperoxide, which is an initiator, was added dropwise over a period of 4 hours and then maintained at the above temperature for 30 minutes.

Further, as a second stage (for hydrophilic chain component), a mixture of 9 parts of n-butyl acrylate, 12 parts of 2-hydroxyethyl methacrylate, 9 parts of acrylic acid, and 1.0 part of di-t-butylperoxide was added dropwise over a period of 30 minutes and then maintained at the above temperature. The point in time at which the graft rate was 90% or more was regarded as the endpoint, and the mixture was cooled to room temperature.

Graft rate (%)=(1−(epoxy value after completion of reaction of the second stage/epoxy value after completion of reaction of the first stage))×100

Thereafter, 51 parts of diethylene glycol monoethyl ether acetate was added, thereby obtaining a graft acrylic resin solution having a solids content of 55%. The weight average molecular weight of the obtained graft acrylic resin was 15000.

17.2 parts of "ETERNACOLL UH-100" (trade name, produced by Ube Industries, Ltd., 1,6-hexanediol-based polycarbonate diol, molecular weight: about 1000) and 2.5 parts of dimethylol butanoic acid, both of which are starting materials of the urethane resin component, 24 parts of n-butyl acrylate and 1.5 parts of ethylene glycol dimethacrylate, both of which are polymerizable unsaturated monomers of the acrylic resin component, and 0.008 parts of butylhydroxytoluene as a polymerization inhibitor for unsaturated groups were placed in a reaction vessel equipped with a thermometer, a thermostat, a stirrer, and a reflux condenser. After the mixture was heated to 100° C. while stirring, 10.3 parts of hydrogenated MDI (4,4'-dicyclohexylmethane diisocyanate), which is a starting material of the urethane resin component, was further added dropwise over a period of 30 minutes.

Thereafter, while the temperature was maintained at 100° C., the reaction was allowed to proceed until an NCO value of 14 mg/g or less was achieved. The weight average molecular weight of the obtained urethane resin component was 20000.

4.5 parts of 2-hydroxyethyl acrylate, which is a polymerizable unsaturated monomer of the acrylic resin component, was further added to the reaction product. The reaction was allowed to proceed until an NCO value of 1 mg/g or less was achieved, and the mixture was cooled to room temperature to obtain an acrylic monomer dilute solution of an acid-group- and terminal-unsaturated-group-containing polyurethane resin.

Stirring was then continued, and 72.7 parts of the graft acrylic resin solution obtained above and 2.0 parts of dimethylethanolamine were added, resulting in neutralization. Water dispersion (phase-inversion emulsification) was performed while suitably adding 112.9 parts of deionized water.

After completion of water dispersion (emulsification), the mixture was heated to 70° C. while stirring. A polymerization initiator solution in which 0.06 parts of "VA-057" (trade name, produced by Wako Pure Chemical Industries, Ltd., a polymerization initiator, 2,2'-azobis [N-(2-carboxyethyl)-2-methylpropionamide]) was dissolved in 2.4 parts of deionized water was added dropwise over a period of 30 minutes, and the mixture was stirred for 2 hours. Thus, the polymerization reaction of the acrylic resin component (polymerizable unsaturated groups) was performed. Since heat was generated to some extent by polymerization heat during the reaction, the temperature was suitably controlled as necessary.

Thereafter, a polymerization initiator solution in which 0.03 parts of "VA-057" was dissolved in 1.2 parts of deionized water was further added as an additional catalyst, and the mixture was stirred for 2 hours while the temperature was maintained, to further allow the reaction to proceed. The mixture was then cooled to room temperature to obtain an aqueous dispersion of acrylic urethane composite resin particles (A-2).

The obtained acrylic urethane composite resin particles (A-2) had a mass solids concentration of 40% and an average particle size of 180 nm (measured with a "COULTER N4" (produced by Beckman Coulter, Inc.) submicron particle size distribution analyzer at 20° C. as diluted with deionized water).

Production of Polyester Resin (D)

Production Example 3

92.9 parts of hexahydrophthalic anhydride, 52.6 parts of adipic acid, 83.1 parts of 1,6-hexanediol, 10.5 parts of neopentyl glycol, 32 parts of 2-butyl-2-ethyl-1,3-propanediol, 1.0 part of maleic anhydride, and 0.12 parts of dibutyltin oxide were added to a reaction vessel equipped with a thermometer, a thermostat, a stirrer, a heater, and a rectification column, and the reaction vessel was heated to 160° C. while stirring the mixture. Subsequently, the content was gradually heated from 160° C. to 240° C. over a period of 4 hours, and the generated condensed water was distilled off through the rectification column.

After the reaction was continued at 240° C. for 90 minutes, the rectification column was replaced with a water separator, about 15 parts of toluene was added to the reaction vessel, and water and the toluene were azeotroped to remove the condensed water. 1 hour after addition of toluene, the measurement of the acid value of the content was started. After it was confirmed that the acid value of the content was less than 3.5, heating was stopped. Subsequently, the toluene was removed under reduced pressure from the reaction vessel, and the reaction vessel was cooled. Then, 58 parts of 2-butyl-2-ethyl-1,3-propanediol was added to the reaction vessel. After the reaction vessel was cooled to 130° C., a mixture of 8.7 parts of styrene, 12.2 parts of acrylic acid, 22.7 parts of 2-ethylhexyl acrylate, and 2.2 parts of tert-butylperoxy-2-ethylhexanoate was added dropwise to the reaction vessel over a period of 2 hours.

After the temperature was maintained at 130° C. for 30 minutes, 0.44 parts of tert-butylperoxy-2-ethylhexanoate was added as an additional catalyst to the reaction vessel, followed by aging for 1 hour. Subsequently, the reaction vessel was cooled to 85° C., the content was neutralized with 14.6 parts of dimethylethanolamine, and 468.7 parts of deionized water was added to the content to disperse the content in water, thereby obtaining an acrylic modified aqueous polyester resin aqueous dispersion (D-1) having a solids content of 35%. The obtained acrylic modified aqueous polyester resin had an acid value of 35 mgKOH/g, a hydroxy value of 11 mgKOH/g, and a number average molecular weight of 6000.

Production Example 4

82.6 parts of 1,6-hexanediol, 12.5 parts of neopentyl glycol, 38.0 parts of 2-butyl-2-ethyl-1,3-propanediol, 38.2 parts of hexahydrophthalic anhydride, 99.3 parts of adipic acid, and 0.12 parts of dibutyltin oxide were added to a reaction vessel equipped with a thermometer, a thermostat, a stirrer, a reflux condenser, and a water separator, and the content was heated to 160° C. while stirring. After the content was gradually heated from 160° C. to 240° C. over a period of 4 hours, the content was subjected to a condensation reaction at 240° C. for 4 hours, thereby obtaining a condensation reaction product.

Then, 13.4 parts of trimellitic anhydride was added to the condensation reaction product, and the mixture was reacted at 170° C. for 30 minutes to add a carboxy group to the condensation reaction product. Subsequently, the condensation reaction product was diluted with 2-ethyl-1-hexanol, thereby obtaining a polyester resin aqueous dispersion (1) having a solids concentration of 70%. The obtained polyester resin had an acid value of 35 mgKOH/g, a hydroxy value of 6 mgKOH/g, a number average molecular weight of 1300.

Production of Nonionic-Hydrophilic-Group-Containing Blocked Polyisocyanate Compound (E)

Production Example 5

1610 parts of "Sumidur N-3300" (trade name, produced by Sumika Bayer Urethane Co., Ltd., hexamethylene diisocyanate-derived isocyanurate structure-containing polyisocyanate, solids content: about 100%, isocyanate group content ratio: 21.8%), 275 parts of "Uniox M-550" (produced by NOF Corporation, polyethylene glycol monomethyl ether, average molecular weight: about 550), and 0.9 parts of 2,6-di-tert-butyl-4-methylphenol were added to a reaction vessel equipped with a thermometer, a thermostat, a stirrer, a reflux condenser, a nitrogen inlet tube, a dropping funnel, and a simple trap for the removed solvent. The content was mixed, and the reaction vessel was heated under a nitrogen stream at 130° C. for 3 hours.

Subsequently, 550 parts of ethyl acetate and 1150 parts of diisopropyl malonate were added to the reaction vessel. While stirring under a nitrogen stream, 14 parts of a 28% methanol solution of sodium methoxide was added to the reaction vessel, and the content was stirred at 65° C. for 8 hours, thereby obtaining a resin solution. The obtained resin solution had an isocyanate content of about 0.1 mol/kg.

Subsequently, 3110 parts of 4-methyl-2-pentanol was added to the reaction vessel. While the reaction vessel was kept at a temperature of 80 to 85° C., the solvent was distilled from the reaction vessel under reduced pressure over a period of 3 hours, thereby obtaining 4920 parts of a blocked polyisocyanate compound (E-1) solution. The simple trap for the removed solvent contained 585 parts of isopropanol. The solids concentration of the blocked polyisocyanate compound (E-1) solution was about 60%.

Production of Acrylic Emulsion

Production Example 6

128 parts of deionized water and 2 parts of "Adeka Reasoap SR-1025" (trade name, produced by Adeka, emulsifier, active ingredient: 25%) were placed in a reaction vessel equipped with a thermometer, a thermostat, a stirrer, a reflux condenser, a nitrogen inlet tube, and a dropping funnel. The mixture was stirred and mixed in a nitrogen stream, and heated to 80° C.

Subsequently, 1% of the entire amount of a monomer emulsion for the core portion, which is described below, and 5.3 parts of a 6% ammonium persulfate aqueous solution were introduced into the reaction vessel, and maintained therein at 80° C. for 15 minutes. Thereafter, the remaining monomer emulsion for the core portion was added dropwise over a period of 3 hours to the reaction vessel maintained at the same temperature. After completion of the dropwise addition, the mixture was aged for 1 hour. A monomer emulsion for the shell portion, which is described below, was then added dropwise over a period of 1 hour, followed by aging for 1 hour. Thereafter, the mixture was cooled to 30° C. while gradually adding 40 parts of a 5% 2-(dimethylamino)ethanol aqueous solution thereto, and filtered through a 100-mesh nylon cloth, thereby obtaining an acrylic resin aqueous dispersion (1) having an average particle size of 100 nm and a solids content of 30%. The obtained acrylic resin aqueous dispersion had an acid value of 33 mgKOH/g and a hydroxy value of 25 mgKOH/g.

Monomer emulsion for the core portion: The monomer emulsion for the core portion was obtained by mixing and stirring 40 parts of deionized water, 2.8 parts of "Adeka Reasoap SR-1025," 2.1 parts of methylene bisacrylamide, 2.8 parts of styrene, 16.1 parts of methyl methacrylate, 28 parts of ethyl acrylate, and 21 parts of n-butyl acrylate.

Monomer emulsion for the shell portion: The monomer emulsion for the shell portion was obtained by mixing and stirring 17 parts of deionized water, 1.2 parts of "Adeka Reasoap SR-1025," 0.03 parts of ammonium persulfate, 3 parts of styrene, 5.1 parts of 2-hydroxyethyl acrylate, 5.1 parts of methacrylic acid, 6 parts of methyl methacrylate, 1.8 parts of ethyl acrylate, and 9 parts of n-butyl acrylate.

Production of Water-Soluble Acrylic Resin

Production Example 7

35 parts of propylene glycol monopropyl ether was placed in a reaction vessel equipped with a thermometer, a thermostat, a stirrer, a reflux condenser, a nitrogen inlet tube, and a dropping funnel; and heated to 85° C. A mixture of 32 parts of methyl methacrylate, 27.7 parts of n-butyl acrylate, 20 parts of 2-ethylhexyl acrylate, 10 parts of 4-hydroxybutyl acrylate, 3 parts of hydroxypropyl acrylate, 6.3 parts of acrylic acid, 1 part of 2-acryloyloxyethyl acid phosphate, 15 parts of propylene glycol monopropyl ether, and 2.3 parts of 2,2'-azobis(2,4-dimethylvaleronitrile) was then added dropwise thereto over a period of 4 hours. After completion of the dropwise addition, the mixture was aged for 1 hour. Further, a mixture of 10 parts of propylene glycol monopropyl ether and 1 part of 2,2'-azobis(2,4-dimethylvaleronitrile) was added dropwise thereto over a period of 1 hour. After completion of the dropwise addition, the mixture was aged for 1 hour. Further, 7.4 parts of diethanolamine was added thereto, thereby obtaining a water-soluble acrylic resin (1) solution having a solids content of 55%. The obtained water-soluble acrylic resin (1) had an acid value of 51 mgKOH/g and a hydroxy value of 52 mgKOH/g.

Production of Base Paint (X)

Production Example 8

66.7 parts (solids content: 20 parts) of the polyurethane resin (A-1), 18 parts of n-octanol, 1 part of n-butanol, 11 parts of dipropylene glycol monomethyl ether, 57.1 parts (solids content: 20 parts) of the polyester resin (D-1), 14.3 parts (solids content: 10 parts) of the polyester resin (1), 16.7 parts (solids content: 10 parts) of the blocked polyisocyanate (E-1), 66.7 parts (solids content: 20 parts) of the acrylic emulsion (1), 25 parts (solids content: 20 parts) of "Cymel 325" (trade name, produced by Nihon Cytec Industries Inc., melamine resin, solids content: 80%), 120 parts of "JR-903" (trade name, rutile-type titanium oxide pigment, produced by Tayca Corporation), and 1.5 parts of "Raven 5000" (trade name, produced by Columbia Carbon, carbon black pigment) were placed in a mixing vessel, and the content was uniformly mixed. The pH, solids concentration, and viscosity were adjusted using "Primal ASE-60" (trade name, produced by Rohm and Haas Company, thickener, solids content: 28%), 2-(dimethylamino)ethanol, and distilled water, thereby obtaining a base paint (X-1) having a pH of 8.0, a solids concentration of 50%, and a viscosity at 20° C. of 40 seconds as measured by Ford cup No. 4.

Production Examples 9 to 25

Base paints (X-2) to (X-18) were obtained in the same manner as in Production Example 8, except that the formulations shown in Table 1 were used.

The numerical values in Table 1 indicate the amount of liquid for solvents, and the solids content for other components.

The component shown in Table 1 is as follows: "Duranate SBN-70D," trade name, produced by Asahi Kasei Chemicals Corporation, pyrazole blocked polyisocyanate compound, solids content: 70%

TABLE 1

(Solvents are expressed on a liquid basis, and other components are expressed on a solids basis.)

| Production Example No. | | 8 | 9 | 10 | 11 | 12 | 13 | 14 | 15 | 16 |
|---|---|---|---|---|---|---|---|---|---|---|
| Name of base paint (X) | | X-1 | X-2 | X-3 | X-4 | X-5 | X-6 | X-7 | X-8 | X-9 |
| Polyurethane resin (A) | A-1 | 20 | 20 | 20 | | 20 | 20 | 20 | 20 | 20 |
| | A-2 | | | | 20 | | | | | |
| Alcohol (B) | n-octanol | 18 | 18 | 18 | 18 | | | 18 | 18 | 12 |
| | n-hexanol | | | | | 18 | | | | |
| | n-decanol | | | | | | 18 | | | |
| | n-butanol | 1 | 1 | 1 | 1 | 1 | 1 | 1 | 1 | 1 |
| | n-tetradecanol | | | | | | | | | |
| Organic solvent (C) | Dipropylene glycol monomethyl ether | 11 | 11 | 11 | 11 | 11 | 11 | | | 17 |
| | Diethylene glycol monobutyl ether | | | | | | | 11 | | |
| | Tripropylene glycol monomethyl ether | | | | | | | | 11 | |
| Polyester (D) | D-1 | 20 | 20 | 20 | 20 | 20 | 20 | 20 | 20 | 20 |
| Polyester other than component (D) | Polyester (1) | 10 | 10 | 10 | 10 | 10 | 10 | 10 | 10 | 10 |
| Nonionic-hydrophilic-group-containing blocked polyisocyanate (E) | E-1 | 10 | 10 | 10 | 10 | 10 | 10 | 10 | 10 | 10 |
| Blocked polyisocyanate other than component (E) | "Duranate SBN-70D" | | | | | | | | | |
| Acrylic emulsion (1) | | 20 | 20 | 20 | 20 | 20 | 20 | 20 | 20 | 20 |
| Melamine | "Cymel 325" | 20 | 20 | 20 | 20 | 20 | 20 | 20 | 20 | 20 |
| Titanium oxide | "JR-903" | 120 | 80 | 180 | 120 | 120 | 120 | 120 | 120 | 120 |
| Carbon black | "Raven 5000" | 1.5 | 1.0 | 2.25 | 1.5 | 1.5 | 1.5 | 1.5 | 1.5 | 1.5 |
| Solids content/% | | 50 | 35 | 60 | 50 | 50 | 50 | 50 | 50 | 50 |

| Production Example No. | | 17 | 18 | 19 | 20 | 21 | 22 | 23 | 24 | 25 |
|---|---|---|---|---|---|---|---|---|---|---|
| Name of base paint (X) | | X-10 | X-11 | X-12 | X-13 | X-14 | X-15 | X-16 | X-17 | X-18 |
| Polyurethane resin (A) | A-1 | 20 | 20 | 20 | 20 | 20 | | 20 | 20 | 20 |
| | A-2 | | | | | | | | | |
| Alcohol (B) | n-octanol | 21 | 18 | 18 | 18 | 18 | 18 | | | 29 |
| | n-hexanol | | | | | | | | | |
| | n-decanol | | | | | | | | | |
| | n-butanol | 1 | 1 | 1 | 1 | 1 | 1 | 19 | 1 | 1 |
| | n-tetradecanol | | | | | | | | 18 | |
| Organic solvent (C) | Dipropylene glycol monomethyl ether | 8 | 11 | 11 | 11 | 11 | 11 | 11 | 11 | |
| | Diethylene glycol monobutyl ether | | | | | | | | | |
| | Tripropylene glycol monomethyl ether | | | | | | | | | |
| Polyester (D) | D-1 | 20 | | 20 | 20 | 20 | 20 | 20 | 20 | 20 |
| Polyester other than component (D) | Polyester (1) | 10 | 30 | 10 | 10 | 10 | 10 | 10 | 10 | 10 |
| Nonionic-hydrophilic-group-containing blocked polyisocyanate (E) | E-1 | 10 | 10 | 0 | 10 | 10 | 10 | 10 | 10 | 10 |
| Blocked polyisocyanate other than component (E) | "Duranate SBN-70D" | | | 10 | | | | | | |
| Acrylic emulsion (1) | | 20 | 20 | 20 | 20 | 20 | 40 | 20 | 20 | 20 |
| Melamine | "Cymel 325" | 20 | 20 | 20 | 20 | 20 | 20 | 20 | 20 | 20 |
| Titanium oxide | "JR-903" | 120 | 120 | 120 | 50 | 200 | 120 | 120 | 120 | 120 |
| Carbon black | "Raven 5000" | 1.5 | 1.5 | 1.5 | 0.63 | 0.25 | 1.5 | 1.5 | 1.5 | 1.5 |
| Solids content/% | | 50 | 50 | 50 | 29 | 63 | 50 | 50 | 50 | 50 |

Production of Effect Pigment Dispersion (Y)

Production Example 26

56.16 parts of distilled water, 1.34 parts (solids content: 0.67 parts) of "Surfynol 104A" (trade name, acetylene diol-based wetting agent, produced by Air Products, solids content: 50%), 2.5 parts (solids content: 0.25 parts) of "Hydroshine WS-3001" (trade name, aqueous vapor-deposition aluminum flake pigment, produced by Eckart, solids content: 10%, internal solvent: isopropanol, average particle size DSO: 13 μm, thickness: 0.05 μm, silica-treated surface), 34 parts (solids content: 0.68 parts) of "Rheocrysta" (trade name, produced by DKS Co. Ltd., cellulose nanofibers, solids content: 2%), and 6 parts (solids content: 1.8 parts) of the acrylic emulsion (1) produced in Production Example 6 were added to a stirring vessel, and the mixture was stirred and mixed, thereby preparing an effect pigment dispersion (Y-1).

Production Examples 27 to 31

Effect pigment dispersions (Y-2) to (Y-6) were obtained in the same manner as in Production Example 26, except that the formulations shown in Table 2 were used.

The numerical values in Table 2 indicate the amount of liquid for distilled water and solvents, and the solids content for other components.

The components shown in Table 2 are as follows:
"Alpaste EMR-B6360" (trade name, produced by Toyo Aluminium K.K., solids content: 48%, non-leafing aluminum flakes, average particle size D50: 10.3 μm, thickness: 0.19 μm, silica-treated surface),
"Xirallic T61-10 Micro Silver" (trade name, titanium oxide-coated alumina flake pigment, produced by Merck & Co., Inc., primary average particle size: about 12 μm, average thickness: about 0.3 μm),
"Primal ASE-60" (trade name, produced by Rohm and Haas Company, thickener, solids content: 28%).

rotary-atomization bell-shaped coater, and the resulting film was allowed to stand for 3 minutes to form a base coating film. Further, the effect pigment dispersion (Y-1) prepared as described above was applied to the base coating film to a dry film thickness of 0.4 μm using a Robot Bell (produced by ABB) at a booth temperature of 23° C. and at a humidity of 68%. The resulting coating was allowed to stand for 3 minutes, and then preheated at 80° C. for 3 minutes to form an effect coating film. Subsequently, a clear paint (Z-1) ("KINO6510," trade name, produced by Kansai Paint Co., Ltd., hydroxy-/isocyanate-curable acrylic resin/urethane

TABLE 2

(Distilled water and solvents are expressed on a liquid basis, and other components are expressed on a solids basis.)

| Production Example No. | | 26 | 27 | 28 | 29 | 30 | 31 |
|---|---|---|---|---|---|---|---|
| Name of effect pigment dispersion (Y) | | Y-1 | Y-2 | Y-3 | Y-4 | Y-5 | Y-6 |
| Distilled water | | 56.16 | 71.95 | 57.53 | 86.97 | 61.60 | 84.16 |
| Wetting agent (S) | "Surfynol 104A" | 0.67 | 0.67 | 0.67 | 0.25 | 0.60 | 0.87 |
| Flake-effect pigment (P) | "Hydroshine WS-3001" | 0.25 | 0.25 | 0.25 | | | 0.32 |
| | "Alpaste EMR-B6360" | | | | | 0.45 | |
| | "Xirallic T61-10 Micro Silver" | | | | 2.12 | | |
| Cellulose nanofbers (R) | 'Rheocrysta" | 0.68 | 0.34 | 0.68 | 0.12 | 0.60 | |
| Rheology control agent other than (R) | "Primal ASE-60" | | 0.34 | | 0.12 | | 0.88 |
| Resin emulsion (Q) | Acrylic emulsion (1) | 1.80 | 1.80 | 0.90 | 0.56 | 1.80 | 2.33 |
| Water-soluble resin | Acrylic resin (1) | | | 0.90 | | | |
| Solvent | Isopropanol | | | | 2.12 | 1.20 | |
| Solids contents/% | | 3.4 | 3.4 | 3.4 | 3.2 | 3.5 | 4.4 |

Production of Substrate
Substrate 1
"Elecron GT-10" cationic electrodeposition paint (trade name, produced by Kansai Paint Co., Ltd., an epoxy resin polyamine-based cationic resin containing a blocked polyisocyanate compound as a crosslinking agent) was applied by electrodeposition to a degreased and zinc phosphate-treated steel plate (JISG3141, size: 400 mm×300 mm×0.8 mm) to a cured film thickness of 20 μm. The resulting film was heated at 170° C. for 20 minutes to be cured by crosslinking to form an electrodeposition coating film, thereby obtaining substrate 1.
Substrate 2
"WP-522H N-5.0" intermediate paint (trade name, produced by Kansai Paint Co., Ltd., a polyester resin-based aqueous intermediate paint) was electrostatically applied to a cured film thickness of 25 μm to substrate 1, and allowed to stand at room temperature for 6 minutes, thereby obtaining substrate 2.
Preparation of Test Plate Example 1

The base paint (X-1) was electrostatically applied to substrate 1 to a cured film thickness of 30 μm with a rotary-atomization bell-shaped coater, and the resulting film resin-based two-component organic solvent-based paint) was applied to the effect coating film to a dry film thickness of 35 μm using a Robot Bell (produced by ABE) at a booth temperature of 23° C. and at a humidity of 68% to form a clear coating film. After the coating, the resulting coated substrate was allowed to stand at room temperature for 7 minutes and then heated in a hot-air circulation drying oven at 140° C. for 30 minutes to simultaneously dry the multilayer coating film, thus forming a test plate.

The film thickness of the dry coating film shown in Table 3 was calculated from the following formula. The same applies to the following Examples.

x=sc/sg/S*10000 x: film thickness (μm)
sc: coating solids content (g)
sg: coating film specific gravity (g/cm$^3$)
S: evaluation area of coating solids content (cm$^2$)

Examples 2 to 19 and Comparative Examples 1 to 11

Test plates were obtained in the same manner as in Example 1, except that the substrate, paint, and film thickness were changed as shown in Table 3.

TABLE 3

| | Example | | | | | | | | | |
|---|---|---|---|---|---|---|---|---|---|---|
| | 1 | 2 | 3 | 4 | 5 | 6 | 7 | 8 | 9 | 10 |
| Substrate | 1 | 2 | 1 | 1 | 1 | 1 | 1 | 1 | 1 | 1 |
| Base paint (X) | X-1 | X-2 | X-3 | X-4 | X-5 | X-6 | X-7 | X-8 | X-9 | X-10 |
| Base film thickness/μm | 30 | 12 | 30 | 30 | 30 | 30 | 30 | 30 | 30 | 30 |

TABLE 3-continued

|  | | | | | | | | | | |
|---|---|---|---|---|---|---|---|---|---|---|
| Effect pigment dispersion (Y) | Y-1 | Y-1 | Y-1 | Y-1 | Y-1 | Y-1 | Y-1 | Y-1 | Y-1 | Y-1 |
| Film thickness of effect coating film/μm | 0.4 | 0.4 | 0.4 | 0.4 | 0.4 | 0.4 | 0.4 | 0.4 | 0.4 | 0.4 |
| 60-degree gloss | 99 | 97 | 96 | 98 | 96 | 99 | 97 | 97 | 96 | 96 |
| Graininess (HG value) | 29 | 30 | 33 | 30 | 32 | 29 | 32 | 31 | 33 | 33 |
| Coating film appearance | S | S | S | S | S | S | A | A | S | S |

| | Example | | | | | | | | |
|---|---|---|---|---|---|---|---|---|---|
| | 11 | 12 | 13 | 14 | 15 | 16 | 17 | 18 | 19 |
| Substrate | 1 | 1 | 1 | 1 | 1 | 1 | 1 | 1 | 1 |
| Base paint (X) | X-11 | X-12 | X-1 | X-1 | X-1 | X-1 | X-1 | X-1 | X-1 |
| Base film thickness/μm | 30 | 30 | 40 | 30 | 30 | 30 | 30 | 30 | 30 |
| Effect pigment dispersion (Y) | Y-1 | Y-1 | Y-1 | Y-2 | Y-3 | Y-4 | Y-5 | Y-1 | Y-1 |
| Film thickness of effect coating film/μm | 0.4 | 0.4 | 0.4 | 0.4 | 0.4 | 0.8 | 0.4 | 0.1 | 1.5 |
| 60-degree gloss | 94 | 94 | 96 | 97 | 95 | 98 | 98 | 94 | 96 |
| Graininess (HG value) | 36 | 35 | 30 | 31 | 35 | 39 | 28 | 25 | 33 |
| Coating film appearance | A | A | S | S | S | S | S | S | S |

| | Comparative Example | | | | | | | | | | |
|---|---|---|---|---|---|---|---|---|---|---|---|
| | 1 | 2 | 3 | 4 | 5 | 6 | 7 | 8 | 9 | 10 | 11 |
| Substrate | 2 | 1 | 1 | 1 | 1 | 1 | 1 | 1 | 1 | 1 | 1 |
| Base paint (X) | X-13 | X-14 | X-15 | X-16 | X-17 | X-18 | X-1 | X-1 | X-1 | X-1 | X-1 |
| Base film thickness/μm | 12 | 30 | 30 | 30 | 30 | 30 | 5 | 50 | 30 | 30 | 30 |
| Effect pigment dispersion (Y) | Y-1 | Y-1 | Y-1 | Y-1 | Y-1 | Y-1 | Y-1 | Y-1 | Y-6 | Y-1 | Y-1 |
| Film thickness of effect coating film/μm | 0.4 | 0.4 | 0.4 | 0.4 | 0.4 | 0.4 | 0.4 | 0.4 | 0.4 | 0.09 | 5.5 |
| 60-degree gloss | 92 | 91 | 90 | 93 | 91 | 91 | 90 | 91 | 87 | 87 | 82 |
| Graininess (HG value) | 35 | 39 | 46 | 38 | 38 | 38 | 35 | 36 | 36 | 30 | 39 |
| Coating film appearance | B | B | B | B | B | B | A | B | S | A | B |

Evaluation of Coating Film

The coating film of each test plate obtained in the above manner was evaluated. Table 3 shows the results.

Specular Gloss (60-Degree Gloss)

The 60-degree gloss value of each test plate obtained above was measured using a glossmeter (micro-TRI-gloss, produced by BYK-Gardner).

HG Value

"HG value" is an abbreviation of the hi-light graininess value. The HG value is an indicator of microscopic brilliance obtained by the microscopic observation of a coating surface, and indicates the graininess in the highlight. The HG value is calculated as follows. First, the coating surface is photographed with a CCD camera at a light incidence angle of 15° and a receiving angle of 0°, and the obtained digital image data (two-dimensional luminance distribution data) is subjected to a two-dimensional Fourier transform to obtain a power spectrum image. Subsequently, only the spatial frequency area corresponding to graininess is extracted from the power spectrum image, and the obtained measurement parameter is converted to a numerical value from 0 to 100 that has a linear relation with graininess, thus obtaining an HG value. The formula of the HG value is as already described above. An HG value of 0 indicates no graininess of the effect pigment at all, and an HG value of 100 indicates the highest possible graininess of the effect pigment.

Coating Film Appearance

The coating film appearance was visually evaluated according to the following criteria.

S: Excellent gloss
A: Slightly inferior gloss
B: Inferior gloss

The embodiments and Examples of the present invention are described in detail above. However, the present invention is not limited to these embodiments, and various modifications can be made based on the technical idea of the present invention.

For example, the structures, methods, steps, shapes, materials, values, and the like stated in the embodiments and Examples above are merely examples, and different structures, methods, steps, shapes, materials, values, and the like may also be used, as necessary.

The structures, methods, steps, shapes, materials, values, and the like stated in the embodiments may be interchangeably combined without departing from the spirit of the present invention.

The invention claimed is:

1. A method for forming a multilayer coating film, comprising the following steps (1) to (4):
   (1) applying a base paint (X) having a solids content ratio of 30 to 62 mass % to a substrate to form a base coating film having a cured film thickness of 6 to 45 μm;
   (2) applying an effect pigment dispersion (Y) having a solids content ratio of 0.1 to 10 mass % to the base coating film formed in step (1) to form an effect coating film having a cured film thickness of 0.1 to 5.0 μm;
   (3) applying a two-component clear paint (Z) containing a hydroxy-containing resin and a polyisocyanate compound to the effect coating film formed in step (2) to form a clear coating film; and
   (4) heating the uncured base coating film, the uncured effect coating film, and the uncured clear coating film formed in steps (1) to (3) to simultaneously cure these coating films; wherein the base paint (X) contains a polyurethane resin (A), an alcohol (B) containing 6 to 12 carbon atoms, and an organic solvent (C) having an HLB of 7 to 9, and the effect pigment dispersion (Y) contains water, a flake-effect pigment (P), a resin emulsion (Q), and cellulose nanofibers (R).

2. The method for forming a multilayer coating film according to claim 1, wherein the mass ratio of the content of the alcohol (B) to the content of the organic solvent (C) of (B)/(C) is 0.7 to 3.0.

3. The method for forming a multilayer coating film according to claim 1, wherein the organic solvent (C) is at least one member selected from the group consisting of propylene glycol monomethyl ether, ethylene glycol monobutyl ether, dipropylene glycol monomethyl ether, diethylene glycol monobutyl ether, and tripropylene glycol monomethyl ether.

4. The method for forming a multilayer coating film according to claim 1, wherein the base paint (X) further contains a polyester resin (D) having a number average molecular weight of 1500 to 10000.

5. The method for forming a multilayer coating film according to claim 1, wherein the base paint (X) further contains a nonionic-hydrophilic-group-containing blocked polyisocyanate compound (E).

6. The method for forming a multilayer coating film according to claim 1, wherein the effect pigment dispersion (Y) further contains a wetting agent (S).

* * * * *